United States Patent [19]

Waters et al.

[11] Patent Number: 5,230,387

[45] Date of Patent: * Jul. 27, 1993

[54] DOWNHOLE COMBINATION TOOL

[75] Inventors: Robert L. Waters, Austin; George F. Roberts, Georgetown; Philip H. Walters, Austin; Howard C. Clark; Don D. Fitzgerald, both of Houston, all of Tex.; Otis V. Stelly, II, Lafayette, La.

[73] Assignee: Magrange, Inc., Houston, Tex.

[*] Notice: The portion of the term of this patent subsequent to Nov. 12, 2008 has been disclaimed.

[21] Appl. No.: 788,130

[22] Filed: Nov. 5, 1991

Related U.S. Application Data

[63] Continuation of Ser. No. 264,445, Oct. 28, 1988, Pat. No. 5,064,006.

[51] Int. Cl.$^5$ .................. E21B 7/04; E21B 47/022; E21B 47/09
[52] U.S. Cl. ........................ 175/45; 175/50; 175/61; 324/346
[58] Field of Search ............ 175/45, 50, 61, 24; 324/346, 367, 369, 326; 33/313, 355 R

[56] References Cited

U.S. PATENT DOCUMENTS

| | | | |
|---|---|---|---|
| 3,285,350 | 11/1966 | Henderson | 175/57 |
| 3,725,777 | 4/1973 | Robinson et al. | 324/8 |
| 3,731,752 | 5/1973 | Schad | 175/45 |
| 3,791,043 | 2/1974 | Russell | 33/312 |
| 4,072,200 | 2/1978 | Morris et al. | 175/45 |
| 4,361,192 | 11/1982 | Trowsdale | 175/45 |
| 4,529,939 | 6/1985 | Kuckes | 175/50 X |
| 4,637,480 | 1/1987 | Obrecht et al. | 175/45 |
| 4,682,421 | 7/1987 | van Dongen et al. | 33/313 X |
| 4,700,142 | 10/1987 | Kuckes | 175/45 X |
| 4,716,973 | 1/1988 | Cobern | 175/50 |
| 4,747,303 | 5/1988 | Fontenot | 175/45 X |
| 4,794,336 | 12/1988 | Marlo et al. | 324/346 X |
| 4,804,051 | 2/1989 | Ho | 175/45 X |
| 4,813,274 | 3/1989 | DiPersio et al. | 33/313 X |
| 4,875,014 | 10/1989 | Roberts et al. | 175/45 |
| 4,909,336 | 3/1990 | Brown et al. | 175/45 |
| 5,064,006 | 11/1991 | Waters et al. | 175/45 |

FOREIGN PATENT DOCUMENTS

| | | | |
|---|---|---|---|
| 2122751 | 1/1984 | United Kingdom | 324/346 |
| 2148012 | 5/1985 | United Kingdom | 324/346 |

OTHER PUBLICATIONS

Robinson et al., "Magnetostatic Methods for Estimating Distance and Direction from a Relief Well to a Cased Wellbore", Journal of Petroleum Technology, Jun., 1972, pp. 741-749.

Primary Examiner—Hoang C. Dang
Attorney, Agent, or Firm—Cox & Smith Incorporated

[57] ABSTRACT

A birectional drilling downhole steering and survey tool for detecting ferromagnetic bodies from an off vertical borehole, transmitting the signals from the downhole sensors to surface equipment while drilling, and for calculation of the range and direction to the detected ferromagnetic body for the use of the directional driller in intercepting or avoiding the ferromagnetic body. In combination with the steering and range and direction to ferromagnetic body capabilities, the downhole tool may also include sensors for detecting formation bed interface, apparatus for electric or gamma ray or radioactive logging, neutron density sensor apparatus and other formation evaluation or correlation apparatus. The downhole tools may be packaged, in either an electric line transmitted tool of MWD transmitted tool.

33 Claims, 9 Drawing Sheets

DOWNHOLE COMBINATION TOOL

CROSS REFERENCE TO RELATED APPLICATIONS

This is a continuation application of copending application Ser. No. 07/264,445 filed on Oct. 28, 1988, now the U.S. Pat. No. 5,064,006.

FIELD OF THE INVENTION

This invention relates to a new and improved oil well downhole combination tool for drilling, steering, directional surveying, magnetic ranging, and other types of formation measuring including and not limited to radioactive, resistivity, and conductivity measuring. The tool can be configured to utilize either electric line or mud pulse telemetry for measurements while drilling, or for both or some combination of both telemetry systems. Many configurations of the steering, surveying, magnetic raging and measuring features of the combination tool could be packaged for a particular job and tailored to the field conditions.

This invention generally relates to the determination of a course of an off-vertical borehole, and determination of range and direction to a subterranean target from a designated position or succession of positions in the off-vertical borehole. More particularly this invention is directed to a system for acquisition of a wide variety of well and formation data in addition to data relating to borehole orientation and magnetic body location which may be coupled with a telemetry system to transmit the data to the surface in real time or quasi-real time while drilling.

BACKGROUND OF THE INVENTION

The invention involves measurement, while drilling, of the earth's magnetic and gravity fields as a reference frame to determine the orientation of a tool in the borehole. Also, the tool senses anomalies in the static magnetic field caused by a ferromagnetic target body or senses a time varying magnetic field created by the injection of an electrical current at some remote point or in the vicinity of a target body. The measurements of the anomalies are used to determine direction and distance, or range, from the position of the tool in the off-vertical borehole to the target. The tool of this invention is also able to provide data that enables simultaneous steering and ferromagnetic detection for controlling the trajectory of the borehole as may be desired, although the steering tools in a wireline configuration will not be used while drilling with a rotating drill string. In this case the drilling rotation would be stopped momentarily while the steering and ranging information or survey was done.

Where the drillstring is not rotating but instead the drill bit is turned by a mud motor at the bottom of the hole, the tool may be used in either a "steering tool" configuration with wireline telemetry to and from the surface, or in the "MWD" measurement while drilling configuration such as that using mud pressure pulse telemetry to and from the surface. All of the steering information would be available without the need for momentarily stopping the drilling to take the ranging survey. The apparatus also includes a sensor or sensors for correlating formation bed interface or measuring geologic strata encountered, apparatus for electric or gamma ray, or radioactive logging, and a telemetry system for transmitting the data to the surface for collection and use, and for transmitting control instructions to sense or downhole microprocessors from the surface to the tool. The combination of sensors for formation evaluation with the magnetic and gravitational reference frames using magnetometers and accelerometers improves the quality of the information available to the explorers of the reservoir during downhole continuous drilling operations. The magnetometer and accelerometer arrangement can be used both for steering the downhole tool and, in conjunction with the formation evaluation equipment, for directional borehole surveying or for correlation with offset wellbores.

The drilling system involved in drilling an off-vertical well typically includes a turbine driver, or "mud motor", and a rotating bit which is connected to a non-rotating drillstring by means of a short, slightly bent section of drill pipe, or "bent sub", an articulated assembly, or a jetting assembly. Alternatively the housing of the turbine may be bent so as to cause the rotating axis of the bit to be slightly out of alignment with the borehole. The orientation of this system may be altered under surface control to advance the borehole along an accurately defined course for interception or avoidance of a target. When drilling such an off-vertical well, it is often necessary to change its course, or path, by controlling the position of the drill itself. The directional drilling processes require a precise knowledge of the orientation of the drill and its path so that the course may be evaluated and decisions made concerning alterations of the borehole path.

A device, known in the art as a steering tool, provides such measurements of the orientation of the drill in the borehole with respect to a reference system while the drilling operation is underway. The steering device usually includes component or directional type magnetometers and accelerometers for sensing the earth's magnetic and gravity fields, thus to provide the required reference framework. The steering device is secured with respect to the drill with a key or other means nd thus fixes the magnetic and gravity reference frame to the drill itself.

The device is mounted in a non-magnetic region sufficiently removed from the drill and other ferromagnetic components in order to respond only to the magnetic fields external to the drill system. As the drilling proceeds, the device measures the components of the magnetic and gravity fields and telemeters the measurement signals to the surface. At the surface they are resolved by suitable computation to provide the driller with values of the orientation of the drill system and/or trajectory of the wellbore.

A representative steering tool is described in U.S. Pat. No. 3,791,043. This steering tool consists of a triaxial component magnetometer to measure the earth's magnetic field and two bubble inclinometers to measure the gravity field. Surface instrumentation resolves the magnetic and gravity measurements to provide readings of the azimuth and inclination of the drill to the driller as well as orientation of the bent sub with respect to the high side (or vertically topmost point) of the hole (toolface). The drill orientation is changed as appropriate in accordance with the readings to adjust the course of the borehole. This U.S. Pat. No. 3,791,043 is specifically incorporated herein by reference.

It is sometimes necessary to determine the direction and range to a nearby subterranean ferromagnetic body from a position in the borehole being drilled. For example, adjacent preexisting wells must be sensed and avoided when a borehole is being drilled as when multiple wells are being drilled from a common small spaced platform. The accuracy of the sensors of the magnetic ranging system, in combination with a telemetry systems that makes readings available to the surface operators while drilling is in progress, is especially suited for avoiding existing wells. Yet another example would be the search for subterranean ore bodies exhibiting magnetism, or those which do not exhibit ferromagnetism. This combination tool will be useful for drilling a pilot shaft to search for conductance properties in applications such as gold for silver mining. Another application could reveal large coal streaks by the nonconductance or resistance encountered. Another example is when the borehole being drilled is an off-vertical relief well being drilled to intercept a blowout well at a depth below the disturbance caused by the blowout. U.S. Pat. No. 4,072,200 is directed to this application and includes magnetometers which detect remnant or induced static magnetic field anomalies resident in the ferromagnetic body involved in the second well or body to be located, or alternately magnetometers which detect a time varying magnetic field created in the well or target body by an electrical current injecting system controlled by the operator. As appropriate, parts of the disclosure of U.S. Pat. No. 4,072,200 are included as part of the disclosure of this application. All of U.S. Pat. No. 4,072,200 is specifically incorporated in this application by reference.

The techniques of drilling one well to intercept another with a target well exhibiting a signal is taught in U.S. Pat. Nos. 3,285,350 and 3,731,752.

Given the case where the target is inaccessible, as in a blowout situation, a method for an approach to the target location is disclosed in U.S. Pat. No. 3,725,777, in which the total magnetic field and magnetic compass readings were made and compared through least squares fit analysis to various assumed positions and magnetizations of the target well casing. However, this technique is subject to location ambiguities.

The measurement of magnetic vector components, as taught in U.S. Pat. No. 4,072,200, allows the determination of target polarity as well as direction and resolves such location ambiguities. In addition, the method of determining range from the tool to the target, using gradient measurements, is applicable for both the static and time varying field techniques.

As shown in the prior art, there have been provided separate tools for steering drilling, and for borehole orientation; anomaly seeking magnetic tools; for either residual and/or time varying magnetic field tools, and formation evaluation tools. Each such tool requires a separate survey to be run with the resulting time and complexity involved. Each operation involves stopping the drilling operation, removing the drillstring with the steering tool or MWD, running a survey with the ferromagnetic body seeking system, returning the drillstring to the well bore, and then continuing the drilling operation. The procedure is expensive, time consuming, complex, and subject to introduction of error. In addition, the bore hole erodes with time.

The combination of the steering tool with the ferromagnetic body seeking system, or magnetic ranging components, into a single tool that operates while drilling and which may include a range of formation evaluation or correlation sensors is a significant advance over the equipment presently available in the industry. Some advantages of the combination are the enhanced orientation capabilities of the ferromagnetic sensing systems, the cost and time savings of the continuous drilling and surveying compared to trips out of the hole for running separate surveys, and the improved quality of the formation evaluation which results from the more pristine borehole condition as measured immediately after drilling in contrast to measurements taken after a drillstring is tripped out when caving, sloughing, and invasion may distort the evaluations. Drilling fluids can be highly caustic, and tend to react With shales, leading to sloughing of formation materials and tool sticking.

Additional advances in safety over the prior tools are especially needed, and are provided by the present invention, in the circumstances of drilling to intercept a blowout well. Any open hole survey operation entails a certain degree of risk, however, hydrostatic conditions encountered in relief well drilling are often abnormal and irregular, and consequently the potential for blowout is higher, The combination tool is either on electric line or a MWD configuration eliminates the need to come out of the borehole with the drillstring so that survey data may be obtained, thus reducing the likelihood of another blowout. Since the drillstring remains in-hole and fluid circulation continues, it is easier to balance or control the hydrostatic pressures, eliminating a common cause of blowouts, Further, advantages to the combination tool are capabilities not found presently in the industry. The magnetic ranging orientation system has a resolution allowing directional drilling accuracy. All directional drilling operations require some method of orienting the downhole tool and the high quality, magnetic sensors in the combination tool provide accurate information for orienting the tool. In combination with a directional drilling assembly the magnetic ranging system will operate in a borehole through unusually high inclinations through which it would be impossible to run a wireline survey at borehole inclinations near the limit of operability for wireline survey, formation evaluation information in real time is very valuable, because it provides a record of information about the formation even if the well blows out, or the tool is stuck, or the hole is lost for any other reason. Even when the drilling assembly is lost, the components of this composite survey system can be retrieved for reuse, or at least the survey data can be retrieved or retained.

Further important improvements over present practice are the pinpointing of responsibility for the drilling and survey operations and a reduction in personnel and therefore a reduction in costs resulting from the combination of steering, magnetic ranging and formation evaluation into a single system operated by a single crew. A very significant advantage also results from transmitting the magnetic ranging information while drilling rather than obtaining it in intervals as is furnished by present wireline tools. Drilling must be stopped to run the wireline tools, so the tendency is to overdrill before stopping to evaluate the formation and determine the trajectory of the borehole. Because the drilling has stopped and the entire rig is idle during the wireline survey and following period when the data is analyzed, there is pressure on the person or persons doing calculations for determining target position based upon large quantities of data taken over long intervals of drilling and corresponding to a substantial length of the borehole. Consequently, mistakes in calculations are more likely. With continuous data transmission occurring during drilling operations, the progress and trajectory can be monitored and the calculations made much more efficiently without the mistake causing pressure posed by an expensive idle drilling rig.

It is highly desirable and advantageous to be able to combine the operations which provide steering information with measurements concerning the range and direction to a subterranean body as well as wellbore trajectories and formation evaluation. The present invention provides this desirable combination by including the static magnetic, gravity, and time varying magnetic measurements in a drilling system. The invention also provides the capability for accomplishing other well and formation measurements including electric or gamma logging, formation temperature, etc., during the drilling operations. This feature provides drilling personnel with the capabililty for immediately and continuously receiving well and formation data to ensure the safety and efficiency of the drilling operation. This information is available to be used in combination with formation evaluation devices which require knowledge of the earth's magnetic and/or gravity fields for orientation. The information measured is converted to a single serial composite signal and transmitted from the subsurface tool to the earth's surface by suitable telemetry means such as by hydraulic signal pulses in the drilling fluid column, by a single electrical conductor, solid state memory with periodic readout, or the like. With the tool fixed into the drilling system, the invention also provides the necessary information to serve the drilling steering purpose.

In the past, acquisition of well survey signals at the surface was dependent on the number of signal electrical conductors extending from the downhole sensing tools in the drilling zone, to the surface. For example, an electrical signal transmission cable having seven conductors has been widely used, thus limiting the acquisition to seven signals. The present invention incorporates signal processing circuitry in the downhole tool which receives and measures any number of-selected signals relating to conditions of the well ;bore and formation. These signals are received as analog signals and the circuitry of the down hole tool digitizes and multiplexes them and processes the signals by way of a microprocessor to form a single composite signal. This single signal can then be transferred to surface signal processing and display equipment by a variety of signal transmission systems such as single electrical conductor, by mud pulse fluid signal transmission, by retention in solid state memory for later retrieval, or by any other suitable means.

OBJECTS OF THE INVENTION

A principal object of this invention is to provide a single tool for many combinations of drilling steering, directional surveying, magnetic ranging, formation evaluation logging and measurement of dynamic mechanical properties of the drillstring. This combination tool could be provided with either a mud pulse telemetry system in an MWD configuration or an electric line telemetry system or both. The tool also could be provided with downhole memory storage to collect data which, would then be read out either by running an electric line down to a wet connection terminal, or by retrieving the tool, including memory section for reading at the surface. This would provide a quasi-real time data read out.

Another object of this invention is to provide means to sense components of the earth's magnetic and gravity fields and also to sense small static magnetic, and small time varying magnetic fields, and/or induced electrical and magnetic fields emanating from a second well and to provide means to relay the information sensed to the surface while drilling is in progress, and to provide a means fixed to a drill system whereby the direction of boring may be controlled from the surface.

Another object is to provide a means of injecting an electrical current so that it may be conducted by the second well and subsequently cause a time varying magnetic field concentric to the well to be developed which would have, a fall off rate of 1/R, the radial distance from the target well.

Another object of the present invention is to make measurements at a plurality of locations within the well to determine: the earth's magnetic field for reference orientation; earth's gravity field for reference orientation; static magnetic field anomalies associated with the target well for use in determining distance by gradient ranging and direction by vector resolution; and time varying magnetic field measurements associated with the target well for use in determining distance by gradient ranging and direction by vector resolution.

Another object of the present invention is to provide a means to acquire formation evaluation and correlation information such as the reservoir characteristics, porosity, permeability, neutron, density, and temperature of the formation in conjunction with the orientation produced.

Another object of the present invention is to provide a suitable surface apparatus to provide azimuth, inclination, and toolface orientation of the drilling system and to provide values of the quantities measured to be used to calculate direction and range to the target well.

An even further object of the apparatus is to provide suitable telemetry for the downhole signal to enable the presentation at surface receiving equipment of signals identifying the various parameters as measured in the borehole while drilling, thereby negating time degradation of the hole. and to present at the downhole tool instructions controlling the downhole sensors and microprocessors.

SUMMARY OF THE PRESENT INVENTION

According to the present invention, the re is provided the capability of surveying subterranean magnetic bodies of material from an adjacent off-vertical borehole, and at the same time surveying the borehole itself to determine its azimuth and inclination, that is, the orientation in space of the borehole being drilled, in combination with a range of formation evaluation measurements. The surveys may be combined to continuously provide information concerning the location in both distance and direction of the target subterranean body from the borehole and the borehole and toolface orientation measurements for steering purposes and so that the information from the formation evaluation sensors can be most accurately tied to a specific point within the reservoir.

In one aspect of the invention, a magnetic survey of a target body is made which measures the components of the total magnetic field, which field includes the target magnetic field superimposed upon the earth's magnetic field. The components of the magnetic fields are measured orthogonal to one another and along the axis of the borehole at the predetermined separation within the tool. Additionally the earth's gravity field is measured and using the measurements, both the orientation of the borehole and data used to determine distance and direction from the borehole to the target are telemetered to the surface, calculated and displayed continuously, while drilling is in progress. In another aspect of the invention the magnetic survey is of the static magnetic field exhibited by the target.

In another aspect, a time varying magnetic field of a predetermined frequency is created in the target and the time varying magnetic field is surveyed.

To accomplish the surveys a system is provided having a downhole tool with sensors for sensing the magnetic and gravity fields and with sensors for sensing the other formation characteristics. The tool generates individual signals indicative of the measurements which are then digitized and multiplexed into a single serialized signal which can be transmitted from the sensing apparatus to the surface where it is decoded and separated into the individual signals and the signals used to compute and display the desired steering information and to display or record the radioactive, conductive, resistive, or other desired formation properties. The system may also be provided with a signal generating apparatus at the surface for telemetry of control instructions down to the tool, which is provided with receiving apparatus to receive and interpret the signals from the surface. By providing the ability to send signals from the surface down to the tool, the timing, and content of the downhole survey information, could be varied as desired. For example, it might be desired to receive more detailed formation evaluation information rather than updating the steering information as often as would be usually desired. In this case a signal could be sent down to the tool to cause steering information to be sent every foot instead of every three inches, and instead of sending the steering information the formation survey information could be measured in greater detail at more frequent intervals and telemetered to the surface. Once the formation of interest had been adequately investigated, a signal could be sent from the surface down to the tool instructing the tool to return to its more usual mode of operation with the more frequent steering signals being telemetered to the surface and less frequent or less voluminous formation evaluation information being transmitted to the surface.

The downhole tool comprises a non-magnetic housing for the sensors which may be fitted in combination into the housing. The tool configured for electric wireline telemetry is constructed to be removably fitted into the interior of a drill collar, in contrast to the tool configured for mud pulse telemetry or MWD which is generally configured as being built in to a non-magnetic sub, or drill collar, although it is possible and in some cases may be desirable to removably fit the downhole tool into an MWD configuration. In an electric wireline configuration the tool as will be described in more detail below, is lowered down into the interior of the drillstring and fitted into a connection within the drill collar. The housing is integrated into the drillstring in a nonmagnetic MWD collar. One common example would be a monel collar. In an electric wireline tool system, the tool is fitted so that in the event of the drilling string sticking, the tool can be retrieved by the electric wireline for use in another housing. In a mud pulse transmission MWD system, downhole memory could be provided with a means for running down a wireline to connect into the system and retrieve the tool housing or at least the data to retain drilling information in the event that the drillstring sticks.

The tool, either electric line or MWD conveyed, contains a pair of triaxial component magnetometers of the fluxgate type which measures the static magnetic field having their individual sensor axes aligned parallel to one another and spaced apart along the longitudinal axis of the tools by separation of approximately one meter. A time varying magnetic field is measured by two or three coil type variometers aligned in the tool in the same fashion as the magnetometers. Gravity field measurement is provided by three accelerometers mounted in the housing perpendicular to one another. The axes of these accelerometers are aligned parallel to the magnetometer axes described above. The combination downhole tool is also provided with apparatus for formation evaluation or correlation, such as electric logging or radioactive logging, and apparatus for detecting other well and formation parameters such as, conductivity, resistivity, porosity, temperature, etd. The tool system also incorporates a system for telemetry, such as a drilling fluid column pulser, a single conductor wireline, electromagnetic wave transmission and receiving apparatus, or solid state recoverable memory for efficiently transmitting all of the well and formation data to signal receiving equipment located at the surface while drilling is in progress. A power supply and associated signal preparation, and transmission electronic devices are provided within the housing.

In a MWD configuration, batteries located in the tool can be charged by a drilling fluid driven turbine generator incorporated within the system. Likewise the electrical current produced by the turbine generator will be available for other uses such as current injection into the formations to enhance the electromagnetic field of the target. Use of a downhole turbine driven generator will enable the availability of electrical power magnitudes greater than those available with: current electric wireline transmitted capabilities.

The surface system includes a receiver for receiving the serial signal and a computer which decodes and separates the composite signal into subsignals indicative of the many measurements taken downhole. In the MWD configuration, the receiver at the surface would comprise, in part, a pressure transducer for converting pressure pulses into electrical signals. The interface also receives a signal from a depth indicator which indicates the depth of the tool in the borehole. The computer accepts as the values of the components measured which in turn are used to calculate azimuth and inclination of the borehole, distance to the target and direction to the target. Appropriate printers, plotters and displays, display and plot the measured and calculated value so that the drilling of the borehole in relation to the target may be continuously monitored and the borehole adjusted while drilling.

In one particular aspect of the invention, the information generated by the tool, in addition to being used for computing distance and direction to the target and borehole orientation, may also be used to determine the path to the interception from the borehole to the target. A method is provided which is especially useful when drilling along an approximate east/west line through the target well. The magnetic field system data are used to calculate the gradient of the axial component of the magnetic field along the axis of the borehole, and to calculate the radial component of the total field orthogonal to the axis of the borehole. The axial gradient and the radial component are then simultaneously plotted as a function of location in the borehole. As the tool passes on the north side or approaches a "North" pole, from the north, the total radial intensity of the magnetic field measured is reduced. When approaching a "South" pole from the north, the total radial intensity would increase. Conversely, when the tool passes to the south of a target and the axial gradient indicates the presence of a north pole, then the total radial intensity will decrease below the normal value. Likewise, a south pole to the north will cause an increase in radial intensity. Knowing the inclination and direction of the borehole, the drilling direction may be altered to the north or south until an interception with the target is achieved.

BRIEF DESCRIPTION OF THE DRAWINGS

A typical embodiment of the instant invention is illustrated in the attached drawings which are to be considered in connection with the detailed description that follows. In the drawings, like reference numbers designate identical or corresponding parts throughout the several views.

In the drawings.

DESCRIPTION OF THE PREFERRED EMBODIMENT

A. General Theory

The general theory upon which the method and apparatus of the instant invention is based is that generally descriptive of and applicable to magnetic and gravity fields. The focus of this invention, however, is the use of magnetic and gravity fields to determine the orientation and path of the borehole with respect to the earth and the orientation of the tool within the borehole, and to combine this information with information about drillstring dynamics and with the formation evaluation measurements made concurrently by the conductivity, resistivity, and radioactivity or other sensors and to transmit the data while drilling to the surface for calculations, readout, and use by surface personnel. The tool also can be used to determine while drilling range and direction to a subterranean target which exhibits or may be induced to exhibit a magnetic field.

The present invention utilizes the characteristics of the earth's magnetic field and gravity field along with the magnetic field of a target source to provide information from which the orientation of a borehole and the range and, direction to the target source from the borehole may be determined. The borehole orientation or correlation information can be combined with the concurrently taken formation evaluation measurements to completely map the formation during the drilling and steering operations. Alternatively, where a formation has already been mapped, the orientation measurements provide additional tool and borehole orientation information which can be used for directional drilling.

Figure 1:
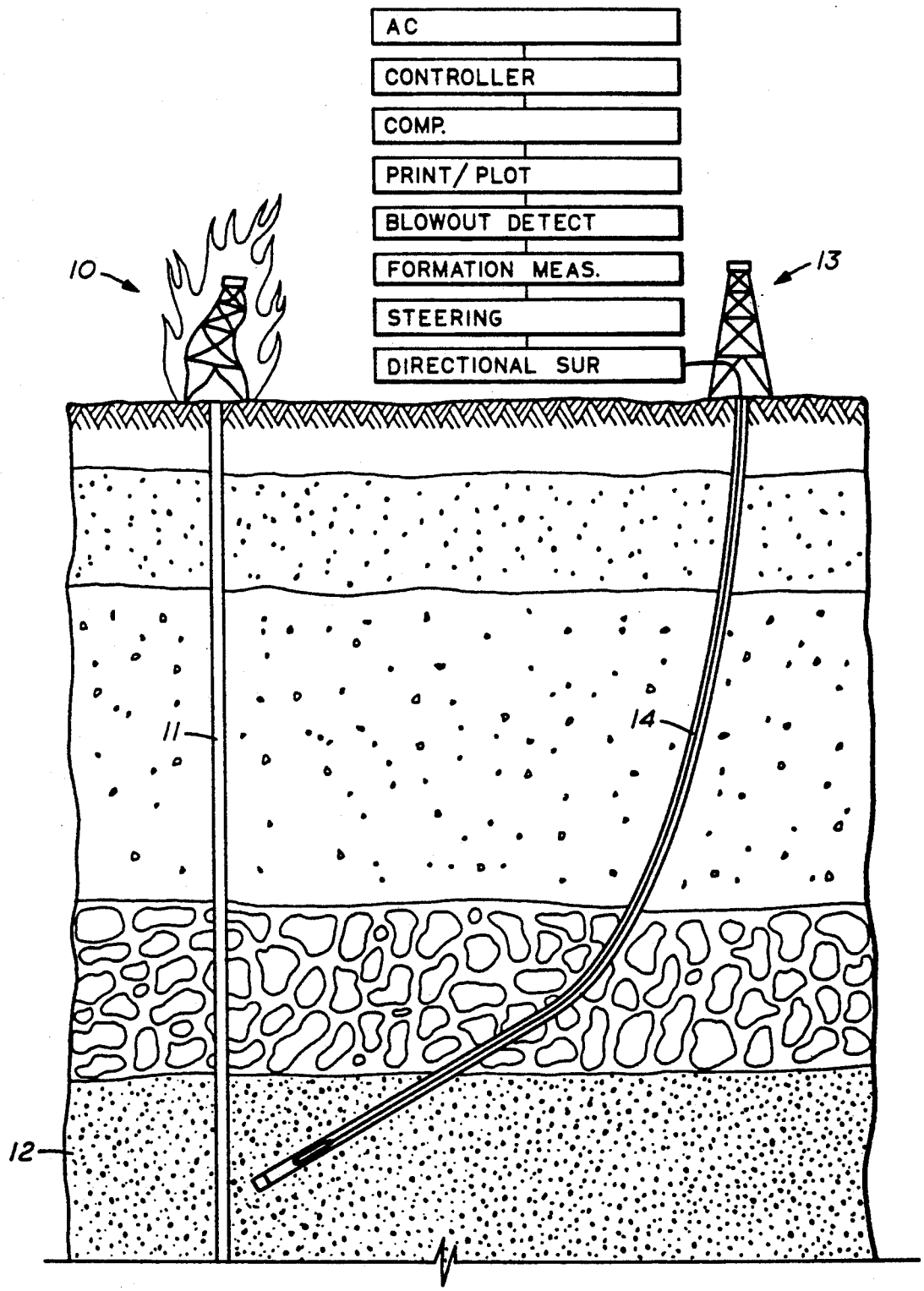
FIG. 1 is a sectional view illustrating the earth's formation and showing the sensing apparatus in a borehole being drilled adjacent to a "blowout" target well intended to be intercepted.
Figure 2:
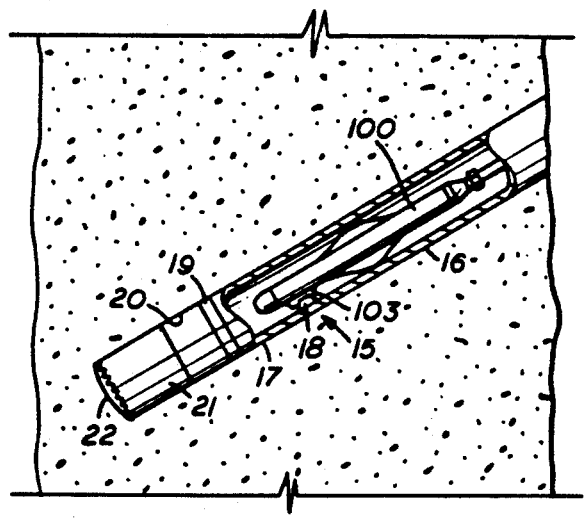
FIGS. 2 and 2A are expanded views of the downhole sensory apparatus of FIG. 1.

FIG. 1 and FIG. 2 illustrate one application to which the method and apparatus of the present invention may be applied, that is, the drilling of a directional relief well to intercept a previously drilled well. As shown in FIG. 1 the blowout well 10 forms a well bore 11 extending to a producing formation 12. For the purpose of killing the blowout well a relief well 13 is drilled providing an directional wellbore 14 so as to obtain a near intercept, or a direct intercept of the blowout well in the producing formation. Drilling fluid and other materials are then pumped into the formation close to the blowout well. These very heavy fluids are forced into the blowout wellbore, and toward the surface by the bottomhole pressure. At some level, the column length of heavy fluids in the blowout well bore will provide a hydrostatic pressure equal to the bottom hole blowout formation pressure and thus additional formation fluids will no longer be forced into the blowout well bore. At this point the blowout well will be dead.

Figure 2A:
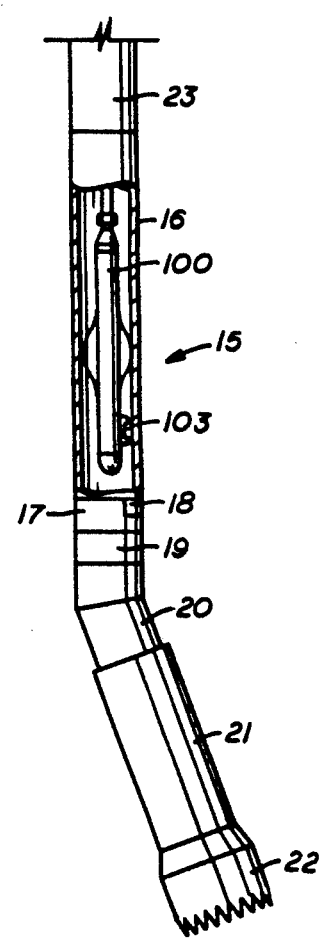

As shown in FIGS. 2 and 2A the downhole tool shown generally at 15 is positioned inside a drill collar 16; composed of a nonmagnetic material such as monel, which is connected to the nonrotating drillstring 23 extending from the surface. Below the drill collar is connected a mule shoe sub 17 incorporating a mule shoe key 18 which provides a directional reference A float sub 19 incorporating a check valve is connected to the mule shoe sub and provides support for a bent sub or steerable assembly 20. A downhole motor 21, which is a turbine motor operated by flowing drilling fluid, extends from the bent sub and supports a suitable drill bit 22. The downhole drill collars can also incorporate a turbine driver electrical generator to provide electrical power for operation of the electronic circuitry of the tool and for supplying electrical current for other activities, for example, injection of electrical current into the formation. In particular, a nonmagnetic monel or nonmagnetic stainless steel encased mud motor 21 could be utilized to minimize interference with the magnetic ranging and directional survey information or additional monel collars could be screwed into the top of the mud motor to displace it vertically from the monel measurement collar. Adjustments or compensation to account for the interference from the magnetic material in the borehole can be made in software, and in addition, or alternatively, insulating fiberglass drill pipe joints could be inserted to cut down on the electrical conductivity of the drillstring.

1. Borehole Orientation

The earth's gravity and magnetic fields may be used to continuously determine the inclination and azimuth of the borehole. Additionally, the rotation of the tool in the hole relative to a fixed coordinate system may be determined.

The earth's coordinate system is:
X horizontal and north, Y horizontal and east, and Z vertical and down.

The tool coordinate system is similar, but referenced to the frame of the device which is in turn referenced to the drilling system by the locking keyway and pin. It is:
$X'$ and $Y'$ perpendicular to one another and in a plane perpendicular to the longitudinal axis of the tool; and
$Z'$ along the tool longitudinal axis and directed downward.
$X'$ and $Y'$ alignments are measured by the X and Y component magnetometers and the X and Y component accelerometers.

Thus the reading of these sensors may be used in standard geometric transformations to provide redundant values of borehole azimuth and inclination, and tool rotation. The values are continuously computed and provided to the drilling personnel.

In the typical case, the magnetic field reference system is used in combination with the gravity field reference system to provide borehole and drilling system orientations. In some cases, such as when the target is nearby only the accelerometer information is used. In any case, both are available as a check.

1. Target Range

Large pieces of magnetic material, such as magnetized casing or drillstring in a borehole, can create anomalies in the earth's magnetic field. An anomaly of this sort will appear as a magnetic field of intensity H superimposed on the earth's field. The general form of the expression for the magnetic field as a function of distance from the anomaly is given by:

$$H = KM/r^n \quad (1)$$

where K is a constant dependent upon such properties as magnetic susceptibility of the material M is the magnetic moment of the magnetic body, and n is the fall-off rate with distance, r, of the magnetic field intensity H of the body.

Differentiating the above expression yields of the rate of change of the magnetic field intensity with respect to radial position from the center of the magnetic body. The derivative is:

$$dH/dr = \frac{-nKM}{r^{n+1}} \quad (2)$$

and expresses a vector quantity that may be referred to as the gradient of H, or grad H, in the radial direction. By forming the ratio of H/dH, an expression results involving only the range, r, to the magnetic body and the fall-off rate n. That expression is:

$$\frac{H}{dH/dr} = \frac{(KM)}{r^n} \frac{(r^{n+1})}{(-nKM)} = \frac{-r}{n} \quad (3)$$

If two measurements are made such that $$\frac{H_1}{dH_1/dr} = \frac{-r_1}{n} \text{ AND } \frac{H_2}{dH_2/dr} = \frac{-r_2}{n}$$

then upon division, $$\frac{H_1}{H_2} \frac{(dH_2/dr)}{(dH_1/dr)} = \frac{r_1}{r_2} \quad (4)$$

or in the alternate, $$\frac{H_2}{H_1} \frac{(dH_1/dr)}{(dH_2/dr)} = \frac{r_2}{r_1}$$

This derivation indicates that the range, r, of an observation point in space from the magnetic body can be determined from magnetic field intensity taken at three or more points along a substantially straight line representing the axis of the relief well to determine the average gradient of the magnetic field between those points.

The values of H and dH/dr for the above equations can be measured using two aligned magnetic field sensors displaced a fixed distance apart. For greater accuracy, an average of the magnetic field intensities measured on two magnetic sensors can be used for the value of H. The difference $\Delta H$ in the readings between two magnetic sensors divided by the separation $\Delta r$ between them yields $\Delta H/\Delta r$, which is the average gradient of the magnetic intensity H over the separation and a good approximation of dH/dr. In practice, these measurements are made continuously and representative points picked from the recorded curves for the appropriate component.

Figure 3:
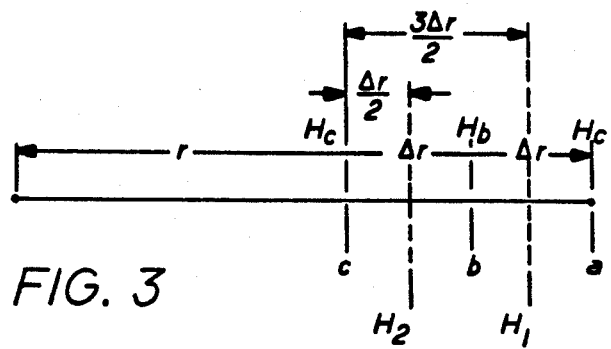
FIG. 3 is a diagram relating to the magnetic ranging technique and relating to the discussion associated therewith.

Referring to FIG. 3, a diagram is presented therein illustrating the foregoing discussion. In order to obtain two measurements of H and $\Delta H/\Delta r$ for substitution in the above equations, it is necessary to make at least three measurements of the magnetic field intensity.

Therefore, to obtain $H_1$, the magnetic field intensity at points a and b must be measured and averaged. The separation of the magnetic sensors defines points a and b, with $\Delta r$ being the distance therebetween. The approximation of $dH_1/dr$ is obtained by dividing the difference in the measured field intensities at points a and b, designated $H_1$, by the separation $\Delta r$. To obtain $H_2$, the displaced magnetic sensors are moved to a new location along the common axis, with the sensor previously at point a moving to point b and the sensor previously at b moving to point c. Similar to the determination of $H_1$, the magnetic field intensity is measured at points b and c with the value of $H_2$ being the average of the two measurements. The approximation of $dH_2/dr$ is obtained by determining the difference between the intensities at points b and c, $\Delta H_2$ and dividing that quantity by the separation, $\Delta r$. The value of r, in equation (4) above is found in FIG. 3 to be $r_1 = r + 3\Delta r/2$, and the value of $r_2 = r + \Delta r/2$. Measurements would be repeated at intervals as the sensors are advanced along a path to update and monitor the closing of the range. Ranging accuracy can be improved with the measurements being made at intervals that are closer together, approaching a continuous recording.

By substituting the above determinations into equation (4), the following equation:

$$\frac{H_2}{H_1} \frac{\Delta H_1/\Delta r}{\Delta H_2/\Delta r} = \frac{r + \frac{\Delta r}{2}}{r + \frac{3\Delta r}{2}} \qquad (5)$$

results, which can be simplified to:

$$\frac{H_2}{H_1} \frac{\Delta H_1}{\Delta H_2} = \frac{r + \frac{\Delta r}{2}}{r + \frac{3\Delta r}{2}} \qquad (6)$$

and rewritten to express the range, r, as follows:

$$r = \frac{\frac{3\Delta r\, H_2\, \Delta H_1}{2} - \frac{\Delta r}{2}}{1 - \frac{H_2 \Delta H_1}{H_1 \Delta H_2}} \qquad (7)$$

Assuming that $\Delta r/2$ is insignificant when compared to r, the equation reduces to:

$$r = \frac{1.5\Delta r}{\frac{H_1 \Delta H_2}{H_2 \Delta H_1} - 1} \qquad (8)$$

where:
$H_1 = (H_b + H_a)/2 \qquad \Delta H_1 = H_b - H_a$
$H_2 = (H_c + H_b)/2 \qquad \Delta H_2 = H_c - H_b$ The range will be expressed in whatever dimensions the separation $\Delta r$ is measured. Typically, it would be in feet or meters.

Once the range, r, is determined, the fall-off rate, n, may be ascertained to indicate the character of the magnetic target. The value of n is obtained by solving the equation:

$$n = r\frac{dH/dr}{H}$$

or the approximation formula $$n = r\frac{\Delta H_1/\Delta r}{H_1}$$

It is to be appreciated that the ranging technique described above can also be carried out with a single magnetic sensor. If only one sensor is used, the measurements of magnetic field intensity must be correlated with the distance down the borehole (the $\Delta r$ distance) at which they are taken in order to ascertain the separation between the points at which the measurements are made. This can be done by suspending the sensor with a cable that is marked to indicate its length. The separation is required to permit the average gradient of the magnetic field, $\Delta H/\Delta r$, to be determined.

It is to be pointed out that ranging with a single magnetic sensor can not, because of practicalities, be as accurate as with two sensors of fixed separation and known alignment with respect to one another. Most important of the practical limitations on using a single sensor is the inability to be sure that the sensor is oriented the same at all measurement locations. It is a basic premise of the ranging technique that the field intensity measurements be made along a straight line and that the magnetic field sensors not change in orientation. If not, appropriate geometric modifications must be made.

While the above theory works, in application the accuracy and confidence is improved if the components of the magnetic fields are measured along mutually orthogonal axes which are permanently aligned along the axis of the borehole.

3. Target Direction

Magnetized structures of various dimensions and configurations create magnetic fields having a characteristic emanation pattern. For example, a magnetized elongated structure forming a magnetic dipole will have magnetic flux lines emanating from one end to the other. However, if the structure is sufficiently long and the point of observation is moved proximate one end, the magnetic body will appear to be one single pole, body with outwardly, radially directed flux lines extending from the elongate magnetic structure. In practice, most situations reduce to these monopole configurations emanating from pipe collars or other imperfections. The magnetic field characteristics can be utilized through appropriate detection by magnetic field sensors, with proper interpretation of the measurements and knowledge of the earth's field, to determine direction to the magnetic body from some point in space.

Figure 5:
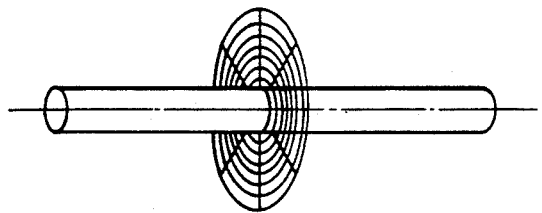
FIG. 4 and FIG. 5 are diagrams of the pattern of emanation of a magnetic field existing in conjunction with the cased well of FIG. 1.
Figure 4:
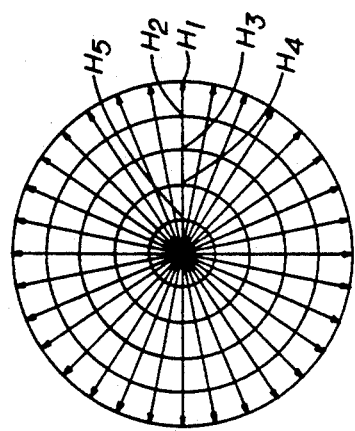

One situation confronted in directional subsurface drilling involves a well casing or a length of drillstring which is the magnetic body to be detected, as in FIG. 1. With the elongate configuration creating a dipole and with the observation point in space being located at a distant point far away from the structure, the magnetic field emanating therefrom will appear to be a radially directed field, as illustrated in FIG. 4 and FIG. 5, with intensity given by $H = KM/r^2$. Utilizing a set of three magnetic sensors arranged orthogonally, the earth's magnetic field and the target's field can be detected and expressed as three components. Since the earth's magnetic field may be determined in a region not influenced by the target, its contribution in the readings of the three sensors can be subtracted out, leaving only the component values of the target's magnetic field in the coordinate system defined by the orthongonal magnetic sensors. The component values can be resolved using conventional vector-analysis techniques to yield an indication of the direction to the target magnetic body.

Figure 6:
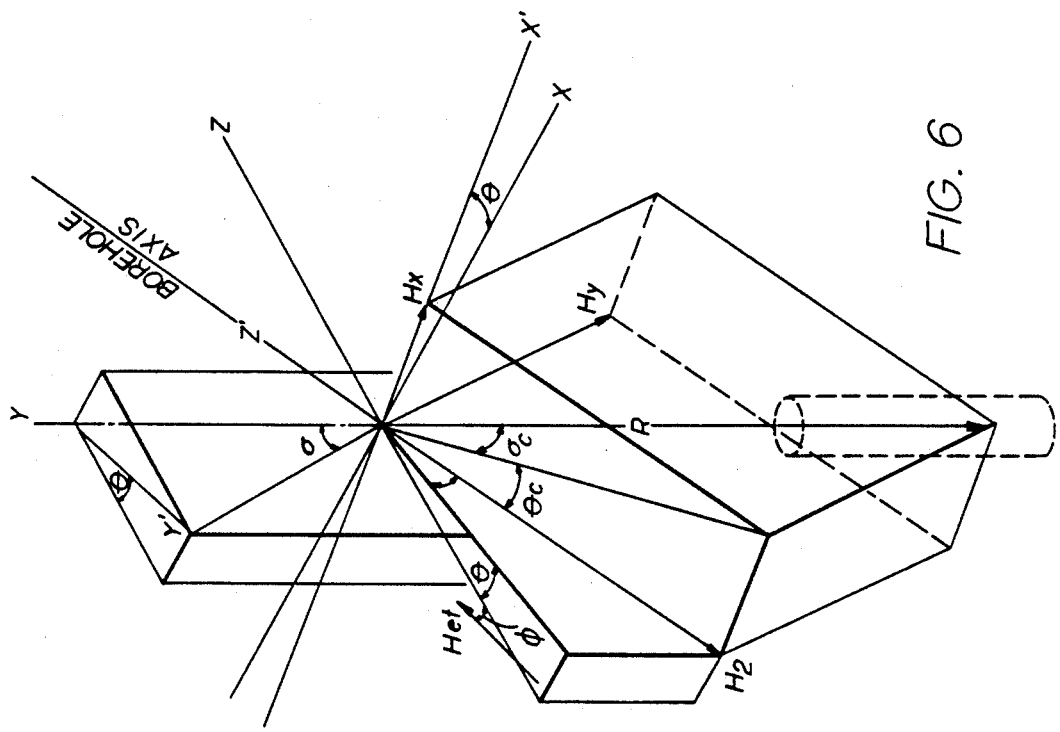
FIG. 6 is a Vector diagram of the coordinate axis system defined by the set of orthogonal magnetic field sensors carried by the subsurface sensing apparatus disposed in the open borehole.

Referring to FIG. 6, there is an illustrative diagram of a magnetic target and the coordinate system defined by magnetic sensing apparatus adequate to serve as an example to which the theory and approach to determining target direction can be applied. The coordinate axis system defined by the three orthogonal magnetic sensors has its three axes referenced as X', Y' and Z'. The horizontal X' axis and the slanted off-vertical Y' axis are perpendicular to the axis of the borehole which is the Z' axis. Due to the slant (sigma) of the borehole, the coordinate axis system formed by the orthogonal magnetic sensors is rotated about the X' axis; and while having a common origin, the magnetic sensor coordinate system and the surface coordinate system do not coincide.

The magnetic field sensors associated with the X', Y' and Z' axes will measure the magnetic filed intensity components of the total magnetic field (i.e. earth and target). The measured component magnetic field intensities of the target field will be referred to as $H_x'$, $H_y'$ and $H_z'$. The diagram of FIG. 6 will also serve as a vector diagram with the reference designations $H_x'$, $H_y'$ and $H_z'$ indicating relative magnetic field components attributable to the target magnetic body.

With the magnetic sensors still a significant distance from the target such that there is no contribution by the target's magnetic field to the measured component values, the earth's magnetic field components in the X', Y' and Z' coordinate axis system can be determined. While the earth's field does have a gradient, it is so slight as to be regarded as insignificant and its intensity treated as a constant. As the field of the target becomes measurable with the advancement of the magnetic sensors down the offset borehole, the measured earth's field components can be subtracted from the total field components being detected by the sensors, thereby leaving only the components due to the target's field in the X', Y' and Z' coordinate system.

Knowing the components of the target field, the location of the target with respect to the origin of the X', Y' and Z' coordinate system can be determined.

A complete description of the components of the earth's magnetic field, $H_e$, in the axial and radial directions can be calculated for any depth location of the magnetic sensors in the subsurface borehole. In order to formulate this description, knowledge is required of the total field intensity, $H_T$, and the dip angle $\phi$, of the earth's magnetic field at the specific location on the earth where the borehole is to be drilled. The total field intensity and dip angle can be obtained from the U.S. Navy Hydrographics Office.

It is also helpful to know the angle of inclination $\sigma$, from vertical and the direction $\Theta$, from magnetic north, of the various depths of interest, of the borehole. This information is obtained prior by taking magnetic field measurements with the subsurface magnetic sensing apparatus. Alternatively, a determination of borehole direction and deviation from vertical, referred to as inclination, at various depths is obtainable through a simultaneous survey conducted by accelerometers in conjunction with the magnetic measurement. The course and direction of the borehole is then determined. With the above information, the component values of the total field, $H_T$, is in the X', Y', Z' coordinate axis system can be expressed by the equations:

$$H_{X'} = H_T \cos\phi \sin\Theta$$

$$H_{Y'} = H_T \{\sin\phi\sin\sigma + \cos\phi\cos\Theta\cos\sigma\}$$

$$H_{Z'} = H_T \{\sin\phi\cos\sigma - \cos\phi\cos\Theta\sin\sigma\}$$

The predicted values of the earth's magnetic field in the X, Y, Z coordinate system may be used to check out proper operation of the magnetic sensors. Also, deviations from the predicted values can be used to indicate the presence of a magnetic target.

To illustrate the above equations, assume that the earth's field, $H_e$, is 43,168 gammas and the dip angle is 37.6°. Further assume that the borehole direction is 35.5° and the borehole inclination is 38.9°. From the above equations, with $H_T = H_e$, the earth's field component measured by the X' axis magnetic sensor is 18,877 gamma. The component measured by the Y' axis sensor is 38,736 gamma, and the component along the Z' axis is 2,575 gamma. To check the values, they may be resolved to a resultant according to mathematic expression: $H_T = H_x^2 + H_y^2 + H_z^2$. Substituting the above values yields the earth's field of 43,168 gamma, as it should.

Continuing with reference to the diagram of FIG. 6, from the magnetic field intensity components $H_x'$, $H_y'$ and $H_z'$ measured by the orthogonal magnetic sensors, the azimuth correction angle $\Theta_c$ and the elevation correction angle $\sigma_c$ can be determined. Assuming no rotation of the coordinate axis system about the Z' axis, the azimuth correction angle $\Theta_c$ can be determined as:

$$\tan \Theta_c = \frac{H_x'}{H_z'}$$

$$\Theta_c = \tan^{-1} \frac{H_x'}{H_z'}$$

The elevation correction angle $\sigma_c$, can be determined as:

$$\tan \sigma_c = \frac{H_y'}{H_x'^2 + H_z'^2}$$

$$\sigma_c = \tan^{-1} \frac{H_y'}{H_x'^2 + H_z'^2}$$

Figure 7:
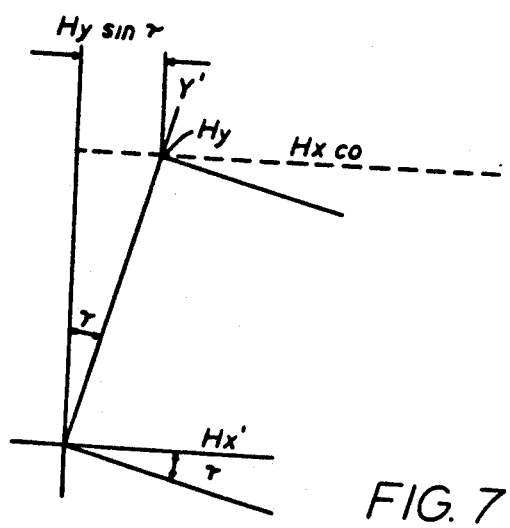
FIG. 7 is a vector diagram relating to the development of correction factors for use in calculation of borehole elevation and azimuth correction angles.

If rotation of the X', Y', Z' coordinate axis systems occurs, there will be no change in $H_z'$; however, the values of $H_x'$ and $H_y'$ will be affected. The vector diagram of FIG. 6 illustrates the following calculation which provides corrected values for the component values $H_x'$ and $H_y'$. The corrected values are used in the above equations for the azimuth correction value $\Theta_c$ and the elevation correction value $\sigma_c$. In the diagram of FIG. 7 and the following and calculations, $\tau$ represents the angle of rotation of the coordinate axis system. From the diagram and beginning with the expression:

$$H_y = \frac{H_y'}{\cos\tau} = H_x \tan\tau$$

which can be written as:

$$H_y = \frac{H_y'}{\cos\tau} + H_x \frac{\sin\tau}{\cos\tau}$$

and simplified to:

$$H_y \cos\tau = H_y' + H_x \sin\tau$$

from which can be shown that the corrected value is $$H_y' = H_y \cos\tau + H_x \sin\tau$$

Further, it can be readily appreciated that:

$$H_x' = H_y \sin\tau + H_x \cos\tau$$

The resultant, R, in the vector diagram of FIG. 6 should not be confused with the range, r, determined in accordance with the ranging technique previously described. The resultant, R, relates only to the directionality of the detected magnetic target, and its magnitude is merely indicative of the total target field strength. The value of the field can be calculated according to:

$$H_{TARGET} = \sqrt{H'_x{}^2 + H'_y{}^2 + H'_z{}^2}$$

The foregoing discussion of target direction determination has been with respect to the detection of static magnetic fields; however, an alternate approach may be used if a time varying magnetic field can be set up about the target. In order to set up a time varying magnetic field, a well casing or the like is excited with an alternating current. The field resulting from this type of excitation will, if diagramed, appear as a series of concentric rings emanating from the target source. The circular flux lines of the field will be directed in accordance with the familiar "right hand rule. " The intensity of field produced will fall-off at a rate inversely proportional to the distance from the target source, i.e. $H = KI/r$.

A set of alternating or time varying magnetic field sensors aligned with the previously described tool coordinate system is used to detect the time varying magnetic field and measure direction and distance to the target. When placed in the time varying magnetic field described above, the component values would be used to determine the value and orientation of the tangent vectors. The directions to the target would be normal to this set of vectors and the field values and gradients thus measured would be used to determine distance in accordance with the gradient ranging techniques described herein.

Although the above method has proven effective, it has been found that the correction angle can be quickly calculated using differences in the radial magnetic field over a distance. The angle of correction from the tool direction has been found to be approximated by the expression:

$$\Theta_c = \tan^{-1} \frac{H'_x}{H'_z}$$

As indicated above, the tool orientation, with respect to magnetic north may be expressed as:

$$\Theta_c = \tan^{-1} \frac{H_x}{H_y}$$

Thus the target direction may be expressed:

$$\text{TARGET DIRECTION} = \tan^{-1}\Theta - \tan^{-1} \frac{\text{GRAD } Y}{\text{GRAD } X}$$

Figure 8:
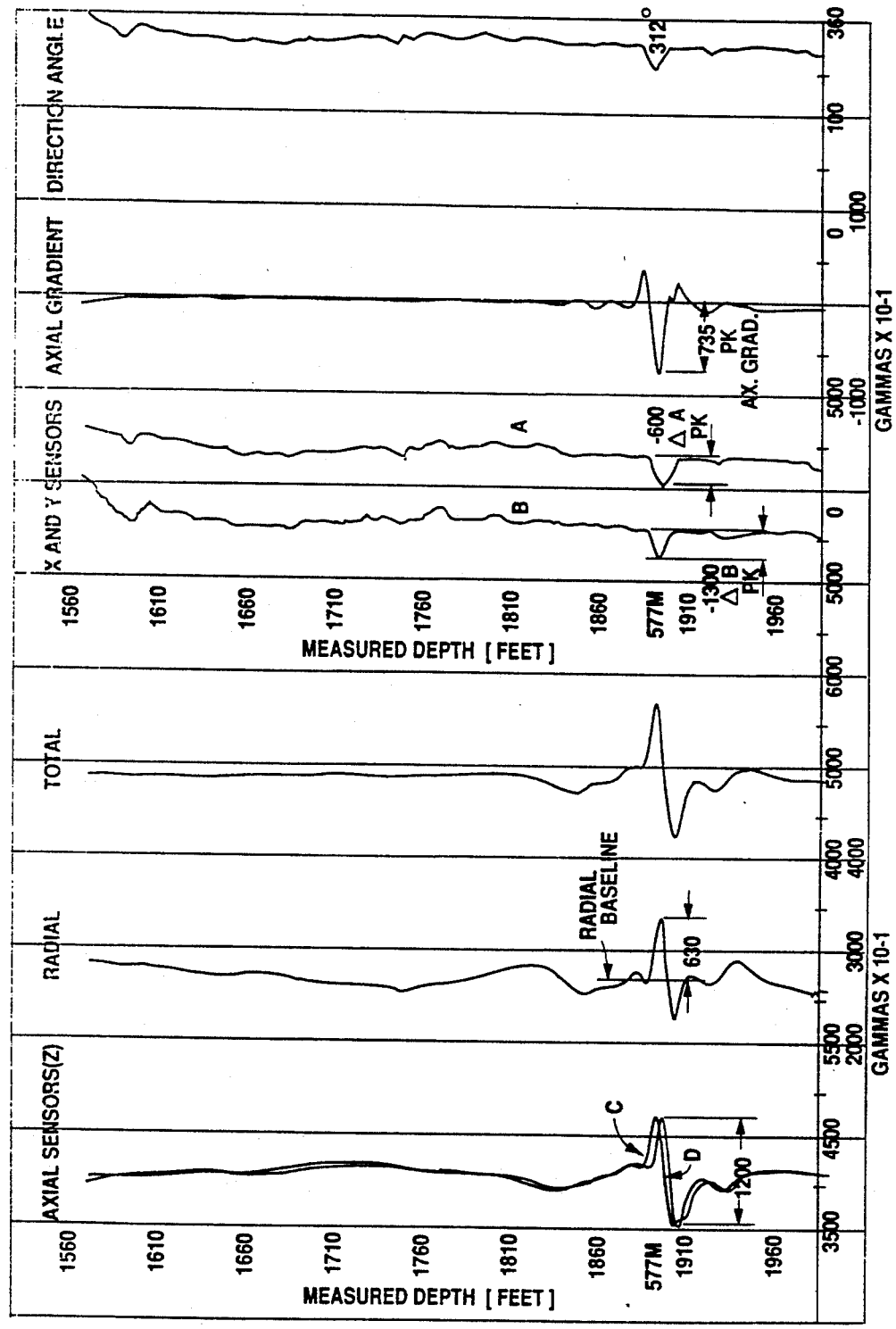
FIG. 8 is a plot of magnetic field data taken in a typical relief well as it approached a target.

A single illustration indicates the ease of the calculation. Referring to FIG. 8, there is illustrated $H_x$, $H_y$. At the depth of 1891 feet, $H_y$ is shown to be $-1300$ gamma, $H_x$ is $-1600$ gamma from their respective baselines and thus $\tan -1 H_y/H_x$ is 312°.

The direction to the blowout is thus $$312° - 180° - 39° = 93°$$

The 180° takes into account of the fact that the polarity of the target is negative.

Similarly as to the gradient ranging techniques discussed above two magnetic sensors in both the X and Y axes may be spaced apart on specific distance r to provide a constant over which the $H_x$ and $H_y$ are measured. These sensors differences are $$H_{x1} - H_{x2} = \Delta x$$

$$H_{y1} - H_{y2} = \Delta Y$$

When divided by the distance r they are expressed as:

$$\frac{\Delta X}{r} = \text{GRAD } X$$

$$\frac{\Delta Y}{r} = \text{GRAD } Y$$

Then the above expression for target direction may be expressed as:

$$\text{TARGET DIRECTION} = \tan^{-1} \frac{H'_x}{H'_y} - \tan^{-1} \frac{\text{GRAD } X}{\text{GRAD } Y}$$

4. Path To Intersection

As noted above, the X', Y' and Z' components of the magnetic field may be measured independently, with the X' and Y' components being perpendicular to one another and perpendicular to the Z' components. However, instead of resolving all three components into a single vector to give direction to the target, the X and Y components may be independently resolved to provide a total radial vector indicative of the strength of the magnetic field in a plane perpendicular to the longitudinal axis of the borehole.

Figure 9:
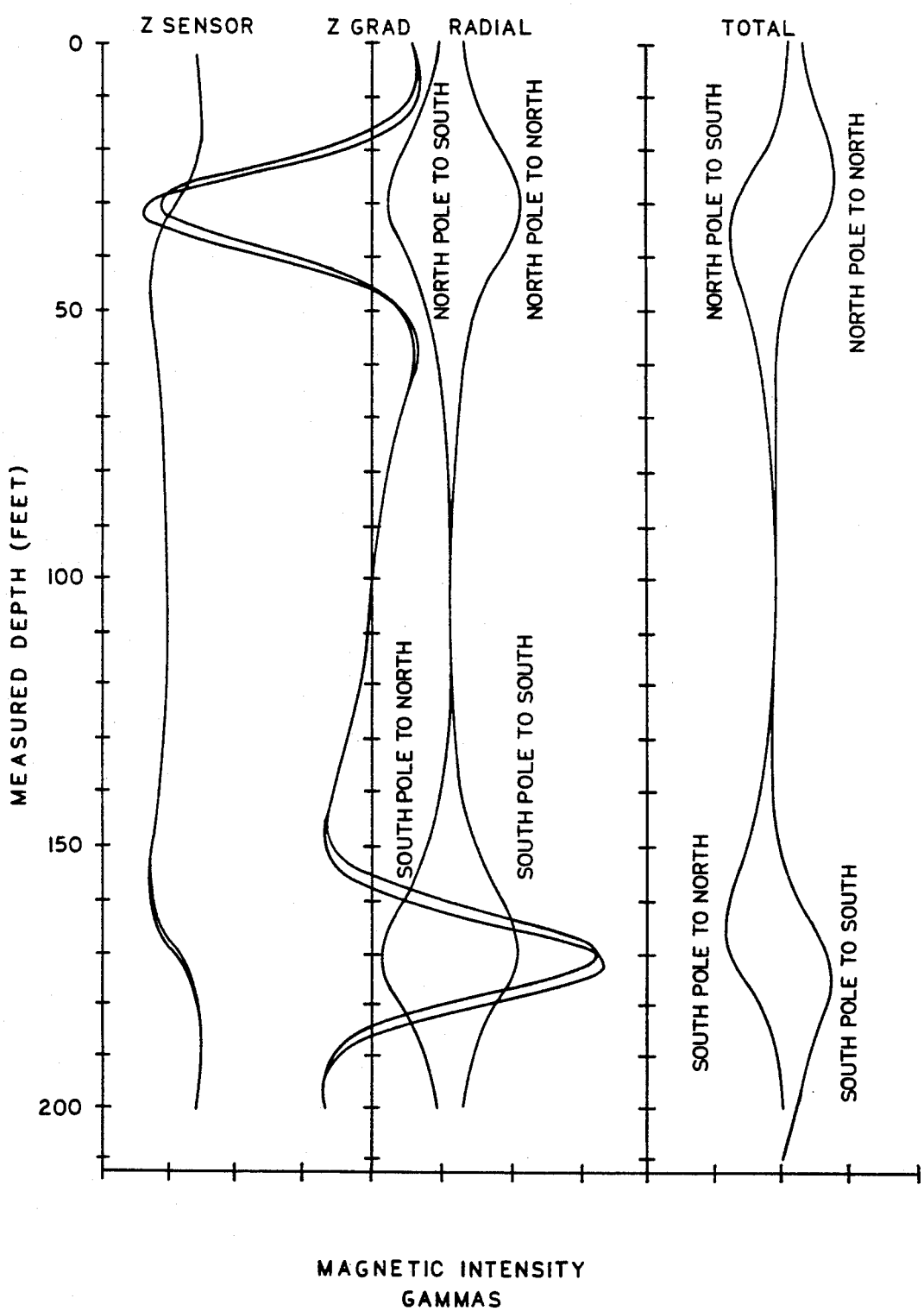
FIG. 9 is a chart showing the magnetic response to sensed North and South poles.

Referring now to FIGS. 9, there is illustrated the response of the various static field magnetometer to two poles of opposite polarity such as might be encountered as the relief well borehole passed near a string of pipe in a blowout well. The poles might be found at successive pipe connections. For purposes of the plots and the following discussion, the static field magnetometers are designed and used so, that when the axis of the magnetometer is aimed toward a north pole, such as that of the earth, the electric output of the sensor is positive.

Referring again to FIGS. 9, the earth's magnetic field has been superimposed upon the target field responses created by the north or south poles. The axial gradient response is in the same sense regardless of position north or south of the target and identifies a north pole and a south pole. However, as shown by the plots, the total radial field to the north of the target has been reduced in the space near the north pole and the total field to the south of the target has been increased. The opposite is true for the south pole. Thus, if a borehole were being drilled toward the target substantially along the east/west line in either direction and the borehole was north of the target, the total radial components would be less in response to the north pole than the radial component of the earth's field. If the borehole were south of the target containing a north pole, the total radial component would be greater than the radial component of the earth's field. The reverse of the above will be apparent when the pole is a south pole. Note that when the "gradiometer" comprised of $Z_1$ and $Z_2$ axial magnetometers is in a borehole and passing the space near a north pole, the peak response of $\Delta HZ$ with sensor polarity convention as described will occur when the sensors measuring $H_{Z1}$ and $H_{Z2}$ are centered about the position of nearest approach to the north pole and the above peak response is negative.

The axial gradient response thus indicates the polarity of the target at a given location and a comparison of the radial response effect on the earth's field with the axial gradient response will indicate whether the borehole is north or south of the target.

While comparison of the axial gradient With the effect of the earth's field on the total magnetic field is one way of determining whether the borehole is north or south of the target, a faster and simpler way is to simply plot the total radial component as the function of depth along with axial gradient as the function of depth. FIG. 9 shows this plotting. When the two curves, the one for the total radial and the other for the axial gradient are in phase, that is when both indicate either positive or negative responses, the borehole is south of the target. When the total radial plot or curve is out of phase with the axial gradient, the borehole is north of the target. If this plotting is monitored continuously while drilling, guidance can be given to the directional driller to drill either north or south depending upon which side of the target the approaching borehole is on. The driller will simply drill in the opposite direction using the information from the gravity sensors and knowing which direction he is drilling until the curves shift, if they were in phase until they shift out of phase or if they were out of phase until they shift in phase. The driller will thus know when he crosses the north/south line and can drill back the opposite direction until an interception is made.

The just described magnetic ranging and steering device can also be considered a very accurate directional survey instrument. As the tool is being steered, the directional survey information can be simultaneously recorded. If the drillstring uses a steerable assembly or double jointed assembly there will be no need to stop drilling, remove the drillstring, and run a directional survey instrument into the open hole. Consequently, much time will be saved. A steerable assembly is simply rotated when the driller wants to drill a straight hole.

B. SURVEY SYSTEM APPARATUS

A survey system in accordance with the present invention for implementing the above theory and techniques of logging a borehole and surveying a subterranean target includes a subsurface tool, transmission and receiving means, and surface instrumentation.

Figure 10:
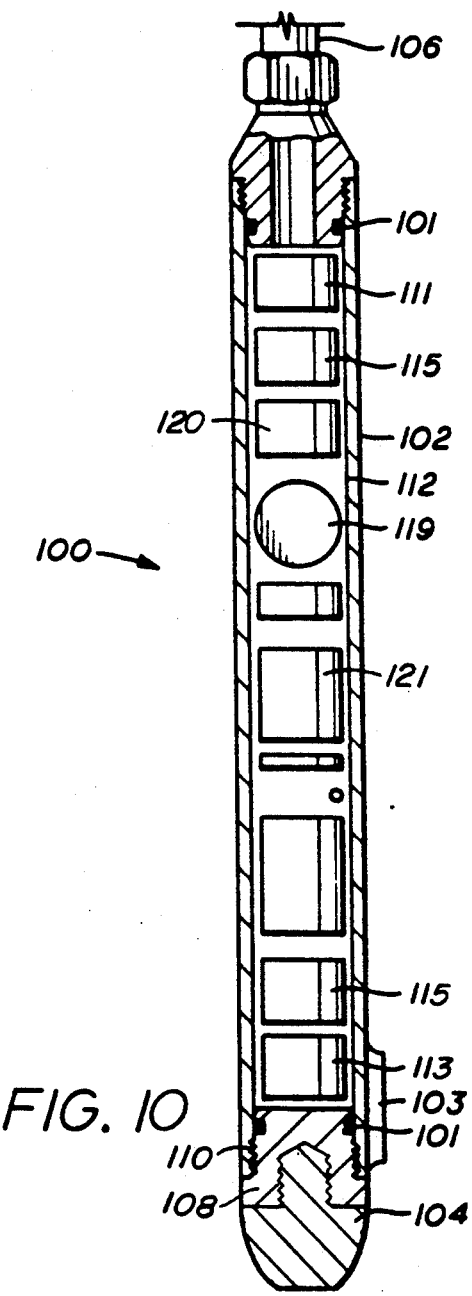
FIG. 10 is a cross-sectional view of one embodiment of the subsurface sensing apparatus.
Figure 10A:
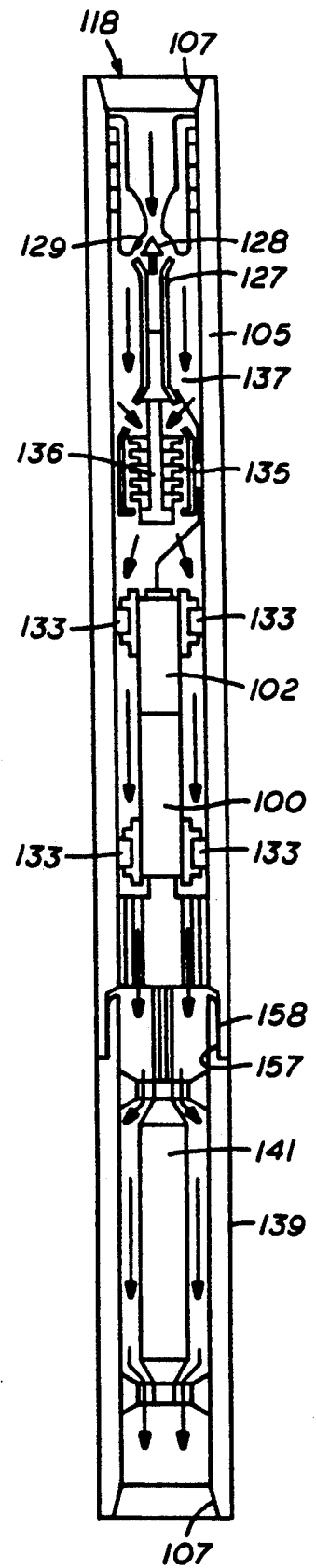
FIG. 10A is a cross-sectional view of an alternative embodiment of the subsurface sensing apparatus.

Referring now to FIGS. 10 and 10A, two alternative embodiments of the subsurface system apparatus are depicted. FIG. 10 illustrates a magnetic and gravity field sensing device 100 in a wireline telemetry configuration. FIG. 10A also depicts the magnetic and gravity field sensing device 100, but in addition illustrates the entire nonmagnetic drill collar or housing 105 of an MWD mud pulse telemetry configuration. Both subsurface instruments incorporate a magnetic and gravity field sensing device 100 having magnetic and gravity sensors and associated circuitry which provide accurate component type triaxial magnetometers 111, 113 and accelerometers 119, 120, 121 capable of detecting minute magnetic and gravity fields and accurately determining the orientation of the borehole. In the wireline tool configuration as depicted in FIG. 10, the magnetic and gravity sensing devise can be lowered down into a drill collar similar to that marked as 105 in FIG. 10A. The tool 100 would be lowered into place by the wireline 106 as will be described in more detail below. In the MWD or mud pulse configuration as depicted by FIG. 10A, the tool 100 is built into the drill collar 105 which may be provided with a side entry port and wireline connection similar to that in FIG. 10A. However in the MWD or mud pulse configuration the wireline would be used only to obtain a readout of information which may be stored in the downhole memory in the event that the combination mud pulse and survey sub 105 becomes stuck. The arrangement of the magnetometers permits the measurement of three magnetic field components simultaneously at two predetermined locations within the instrument. The accelerometers and magnetometers provide continuous signals which are digitized and multiplexed into a single signal stream and transmitted up the borehole to the surface by suitable telemetry such as wireline or mud pulsing. The magnetic and gravity sensors are arranged, to stand alone or to be used in combination with one or more formation evaluation or correlation devices provided as modules. For example, devices providing formation survey signals such as permeability, temperature, radioactivity, conductivity, resistivity, neutron, density, and ultrasound may be incorporated in or with the tool to provide drilling personnel with desired formation parameters. Additionally, information concerning drillstring dynamics such as weight on bit, torque, and drillstring harmonics can be sensed downhole and telemetered to the surface.

Various arrangements are used to measure resistivity depending upon the type measurement required. Direct resistivity measurements are accomplished by passing an electric current out into the formation. Induction measurements are accomplished by driving higher frequency alternating current through transmitter coils, thereby inducing secondary current flow in the formation, which in turn creates fields whose strengths are a function of the formation conductivity, and which are detected by receiver coils. The receiver coil measured parameters are proportional to the conductivity of the formation.

The direct resistivity measurement can also be used where the drilling mud is more conductive, or saline, in contrast to the induction or conductivity measurement which is more effective in oil based muds. Depending upon the conditions expected or encountered, the combination tool can be provided with capabilities to measure either or both. Where both are used, comparing the data provides information on profiles of the formation and very good information on water saturation. When this information is correlated with the information from the accelerometers and magnetometers of the steering and directional survey component of the tool, an even more precise profile of the formation emerges. And true vertical formation thickness and true vertical depth (TVD) can be easily ascertained.

With the addition of electromagnetic: transmitters and receivers to the tool having spaced receiver antennas, at known and constant distances from the transmitting antennas, the formation can be logged by propagating electromagnetic waves and measuring or inferring the resistivity from difference in phase between the two signals at the receiving antennas. An electromagnetic wave propagation resistivity logging tool works well with many mud types, has excellent resolution, and requires less nonconducting material than many other logging tools. These sensors could be built into a steel collar without the requirement of a non-magnetic material. The receiver component would be a dual channel super heterodyne receiver with a highly stable phase detector. Both the transmitter and receiver are interfaced and connected to the multiplexing and digitizing apparatus for telemetry to the surface. The phase differences which are detected downhole are telemetered to the surface microprocessing apparatus where that information is processed by numerical analysis techniques to infer the resistivity of the formation which as described above is very useful in the search for hydrocarbons. As with the various other formation evaluation techniques described herein, this particular electromagnetic wave propagation technique can be used both with electric wireline devices and with MWD or mud pulse telemetry systems, and it also can be combined as desired with other formation evaluation techniques for correlation.

Another possible module of the combination tool would comprise a high-energy gamma ray source and gamma ray detection device. The degree of scattering of the gamma rays is proportional to the electron density and hence to the bulk density of the formation, and the formation porosity can be calculated.

Yet another module to the tool would provide a high-energy neutron source and a low-energy neutrons detection device. The neutrons rebound from heavy nuclei with high-energy but lost energy when they collide with light hydrogen nuclei. The low-energy neutron detected at the tool are proportionally related to the hydrogen present in the formation, or staged differently, are proportional to the water and hydrocarbon contained in the porosity. It is thus an excellent porosity measurement indicator.

The density and neutron porosity measurements can be done simultaneously and compared. Because the two measurements give different responses in different lithologies and to the presence of clay and gas, or water and hydrocarbon, a comparison will allow determination of the composition of the lithology and the formation's content of clay and gas, or water and hydrocarbon, and further will give a more accurate porosity measurement.

It may also be desirable to incorporate a module for detection of the natural gamma radiation of the formation. For example, shales contain potassium with radioactive isotopes and thus provide a consistent maximum. Normal sandstones and carbonates display little or no radioactivity, and micaceous or argillaceous sandstones or carbonates fall in between. The natural gamma radiation detected therefore provide a correlation to other measurements.

The above mentioned formation evaluation or survey devices can either be incorporated into the housing of the tool or individual modules or survey devices can ,be fitted into a separate sub or drill collar housing and stacked to provide the desired range of information. Suitable connections would be provided to link these sensors in separate subs to the microprocessor, multiplexer, and digitizer for telemetry to the surface.

Signals from all of the mentioned survey devices would be digitized and multiplexed for transmission to the surface signal processing equipment and provisions can be made for the survey devices to receive control signals from the surface.

As mentioned, in the conditions usually encountered, suitable telemetry methods would be electric wire line or mud pulsing. In some applications, such as extreme fast drilling situations using an MWD configuration, mud pulse telemetry might not be sufficient because of the volume of data required to be transmitted for magnetic ranging, especially when magnetic ranging is combined with several formation evaluation measurements. A faster telemetry alternative to the relatively slower telemetry by mud pulse, as opposed to an electric line would be to accumulate data in down hole memory. At timed intervals the drilling could be momentarily stopped and an electric line run down to make a temporary wet connection to retrieve the data. This would provide near real time read out of the data collected.

An alternative telemetry mode could utilize an electric line run along the side of the drill pipe which could enter through a side entry sub to make a wet connection at the top of the combination tool.

The surface instrumentation provides data processing equipment for decoding and manipulating the data obtained by the subsurface instrumentation. A receiver and interface are provided for the decoding of the multiplexed signal and adding a depth signal. A computer is provided in which the data are stored and processed. Processing of the data is in accordance with predetermined programs that manipulate the data to calculate borehole orientation and range and direction to the subterranean target. Recording, printing, plotting, and display equipment are provided so that measured and calculated values may be monitored continuously and in real time.

Subsurface Field Sensing Equipment a. General

The subsurface instrument is designed to detect static and time varying magnetic fields as well as the earth's gravity field. To provide such capability, the instrument includes multiple sensors to provide a DC or static magnetic field sensing system, and AC or time varying field sensing system and a gravity field sensing system. When static magnetic fields are to be detected, referred to as the passive mode of operation, the instrument's static magnetic field sensing system is utilized. When operating in the active mode, as when time varying fields are to be detected, the time varying field sensing system is activated. The gravity and static magnetic field sensing system are is utilized in both modes for borehole and tool orientation.

Basically, the DC magnetic field sensing system comprises a pair of triaxial magnetometers defining X, Y, Z coordinate systems. The X, Y, Z axes are aligned with the X and Y axes perpendicular to the longitudinal axis of the instrument and the Z axis lying along the longitudinal axis of the instrument. The two magnetometers are spaced apart a predetermined distance in the instrument so that the magnetic field components along the X, Y, and Z axes may be measured and differenced so that the gradient of each component can be calculated. Using this information the range and direction to the detected target may be determined by the method described above.

The time varying field sensing system comprises a triaxial pick up coil mounted adjacent to and aligned with the two triaxial magnetometers, or alternatively, three orthogonal pick-up coils aligned in the instrument in the same fashion as the two magnetometers. The time varying field is established by an electrode which is fixed within and through the drill pipe a distance above the sensor and which injects current into the volume of earth surrounding the drillstring and including the target. Sufficient power for the current injection is available from a mud driven turbine generator which should provide at least in the range of 100V measured peak to peak, at a few amps of current. The electrode is isolated from the drill string and the drilling assembly is insulated for some distance, as much as 200 feet above the electrode. Alternatively the time varying or AC field is established by injecting current into the target well without the need for insulating the drilling assembly. The target well is isolated from the return path, which may be another well or a ground electrode system isolated from the target well.

Excitation of the target by current produces a circular magnetic field around the target. In the downhole measurement tools, the circuitry associated with the pick-up coils tunes each pick-up coil to the predetermined frequency of the current injected into the target. The time varying or AC magnetic field sensors can then be used to detect the time varying component of this field and determine range and direction to the target.

Gravity sensing is provided by at least two accelerometers with their axes aligned with the magnetometers axes that is, the accelerometers are aligned perpendicular to one another and parallel with the axes of the magnetometers.

A power supply provides the required voltages for the sensors as well as the subsequent signal preparation and transmission components. The analog output from each of the sensors is connected to an analog multiplexer which in turn is connected to an analog-to-digital converter. The digital information is then transferred by a microprocessor to a modem which transmits the signal to the surface on a single conductor wireline or mud pulse telemetry system.

b. Mechanical Configuration

The primary difference between the two versions of the tool 100, are that generally, the wireline tool as in FIG. 10 is designed to be installed and retrieved into a drill collar by the wireline 106, and is also designed to utilize the wireline 116 for telemetry of information from the downhole sensors to the surface. In contrast to the wireline configuration, the mud pulse tool depicted in FIG. 10A provides a magnetic and gravity instrument 100 which is built-in to a nonmagnetic drill collar 105 which is installed just as any other drill collar would be into the drill string with the tool 100 in place. Because the tool 100 as illustrated is built-in the drill collar there would be no need for the wireline to lower or retrieve the tool and there would be no need for the, nose cone 104, keyway 103 or any other provision for connection into a mule shoe sub.

Referring now to FIGS. 10 and 10A, there is shown in FIG. 10 a cross-sectional view of one embodiment of a subsurface field sensing apparatus, referred to as the tool 100 having a generally cylindrical and elongated configuration. The following description of the tool 100 and its internal components apply generally to both telemetry configurations, wireline and MWD or mud pulse. The body portion of the tool comprises a tubular outer housing 102 of non-magnetic material, preferably a nonmagnetic stainless steel, having a nose cone 104 at the bottom end and the connector housing 106 at the upper end. Nose cone 104 includes an adaptor 108 having threads 110 thereon which provide a means for attaching the nose cone 104 to housing 102. An alternate embodiment would provide a nose cone adaptor providing for connection to additional subs which would be fitted into the drillstring below the magnetic and gravity survey sub. By providing such an electrical connection the various survey devices which have been described above could be tied into or interlocked with multiplexing, digitizing and telemetry system for transmittal of information to the surface. Alternatively the various devices could be built into one sub or drill collar which is provided with mule shoe connection for interlocking connection with the housing 102 of the magnetic and gravity survey tool 100. Seals 101 such as 0-rings or high pressure seal rings are provided for sealing the tool against the environment in the borehole. A keyway 103 is provided on the body 102 of the tool which mates with the key way or pin in the orienting sub or collar 17 in the drillstring 23 which fixes the tool in relation to the drillstring. This is shown in FIGS. 2, 2A, and 10. The tool is held in a non-magnetic collar 16 above the pin by the appropriate length of spacer.

Enclosed within the outer housing 102 of both embodiments of the tool are the electronics for the tool 100. The various sensing devices and associated circuit boards are carried on a frame 112 that fits within and extends for substantially the entire length of the housing 102. When the survey is performed in connection with formation evaluation tools such as those for measuring resistivity, conductivity, or radioactivity this frame is inserted in a housing designed to hold all tools. Two triaxial magnetometers, 111 and 113, are mounted on either end of the frame 112 to provide maximum separation. Also mounted to the lower end of the frame 112 are the triaxial alternating magnetic field pick-up coils 115. Three accelerometers 119, 120 and 121 are mounted centrally on the frame.

Referring now only to FIG. 10A there is depicted an MWD or mud pulsed telemetry embodiment of the combination tool. FIG. 10A depicts a nonmagnetic sub or drill collar 105 with threads 107 at both ends of the drill collar for threaded connection into the drillstring. The arrows 109 depicted in FIG. 10A which point in a general downward direction illustrate the direction of mud or fluid flow down through the drillstring. The mud pumps on the surface pump the mud down through the drillstring into the upper end 118 of the survey sub 105, and past the mud pulser 127. The mud pulser 127 comprises a valve seat 129 and a valve 128 which is actuated in response to signals from the downhole survey microprocessor apparatus. Actuation of the valve 128 to seat against the valve seat 129 closes the fluid or mud passage which sends a pressure signal through the fluid column to the surface. In this manner the information collected by the downhole sensors described above can be multiplexed and digitized and transmitted to the surface by mud pulse telemetry. As previously described it is also possible to provide a mud pulse receiving device downhole which can receive mud pulsed signals from the surface in order that signals can be sent from the surface down to the steering, sensing and survey apparatus.

Referring to FIG. 10A and the fluid flow of the drilling mud, there is depicted in the turbine 135 which is powered by the fluid flow through the drillstring. The turbine 135 is connected by a shaft 136 to a generator 137 which provides downhole power. Power from the generator can be used to charge or recharge downhole batteries if the tool is so equipped and is also available for powering the steering sensing and survey apparatus, and is available for the downhole current injection for formation evaluation.

As the fluid 109 flows through the turbine it next passes between the void spaces provided between the inner wall of the drill collar 105 and the surface of the outer housing 102 which encloses the downhole microprocessor, multiplexer, digitizer, and magnetic and gravitational survey devices. FIG. 10A as illustrated, the tool 100 is mounted within the drill collar 105. Each end of the tool 100 is positioned within the interior of the drill collar 105 and securely held by mounting components 133 which are located at the extremities of the cylindrical housing 102. A variety of configurations are possible for the positioners 133, important considerations are that the connectors provide a secure and immovable support for the tool 100 within the drill collar 105 which also allows for flow of the drilling fluid or mud past the tool 100 through the drill stem down toward the bottom of the hole. As will be described below this fluid can be used to power a mud motor to turn a drilling bit. Another consideration for the design of the tool 100 and its housing 102 and connectors 103 to the drill collar 105 is that the annular space between the housing 102 and the interior wall of the drill collar 105 should allow for sufficient flow of drilling mud so that there is no appreciable pressure changes as the drilling fluid passes by the tool 100.

The downhole combination tool of FIG. 10A, is provided with a second sub 139 which is threadedly connected by external threads 157 on the sub or collar 139 which threadedly connect to internal threads 158 at the lower end of the sub or collar 105. The second sub 139 depicted in FIG. 10A is used to house other types of formation sensors as desired as shown at 141. Alternatively instead of the arrangement shown with two subs threadedly interconnected the additional sensors 141 could all be built into a single collar 105. The advantage to building everything into a single unit would be that there would be less likelihood for failure of the connection of the sensing devises to the telemetry apparatus, since the connection would be made during the manufacture of the unit, and would not be susceptible to problems which might occur in the field. Advantages to providing separate components for separate sensors, would be that tool units could be put together as modules to provide survey and formation evaluation capabilities as desired in a particular case. The threads 107 shown at the bottom of FIG. 10A are utilized to connect the tool to the bottom part of the drillstring, which could include a variety of other evaluation subs, such as a bent sub or steerable sub, or to a drillbit in the case of rotational drilling, or to a downhole mud motor which would be turned by the drilling fluid in a manner similar to the above described turbine, except that the downhole mud motor would be used to turn a drilling bit.

The mechanical positioning of each of the magnetometers and accelerometers is critical, not only with respect to the outer housing 102 but also to each other. An X, Y, and Z reference coordinate system is set up with respect to the central axis of the tool, the Z axis being along the axis of the tool 100 with the X and Y axes being perpendicular to the central axis of the tool. The Z axis sensors of each of the magnetic sensing devices magnetometers 111 and 113, and pick-up coils 115, should be precisely aligned, or alternatively, correction for misalignment may be accomplished in software.

Figure 11:
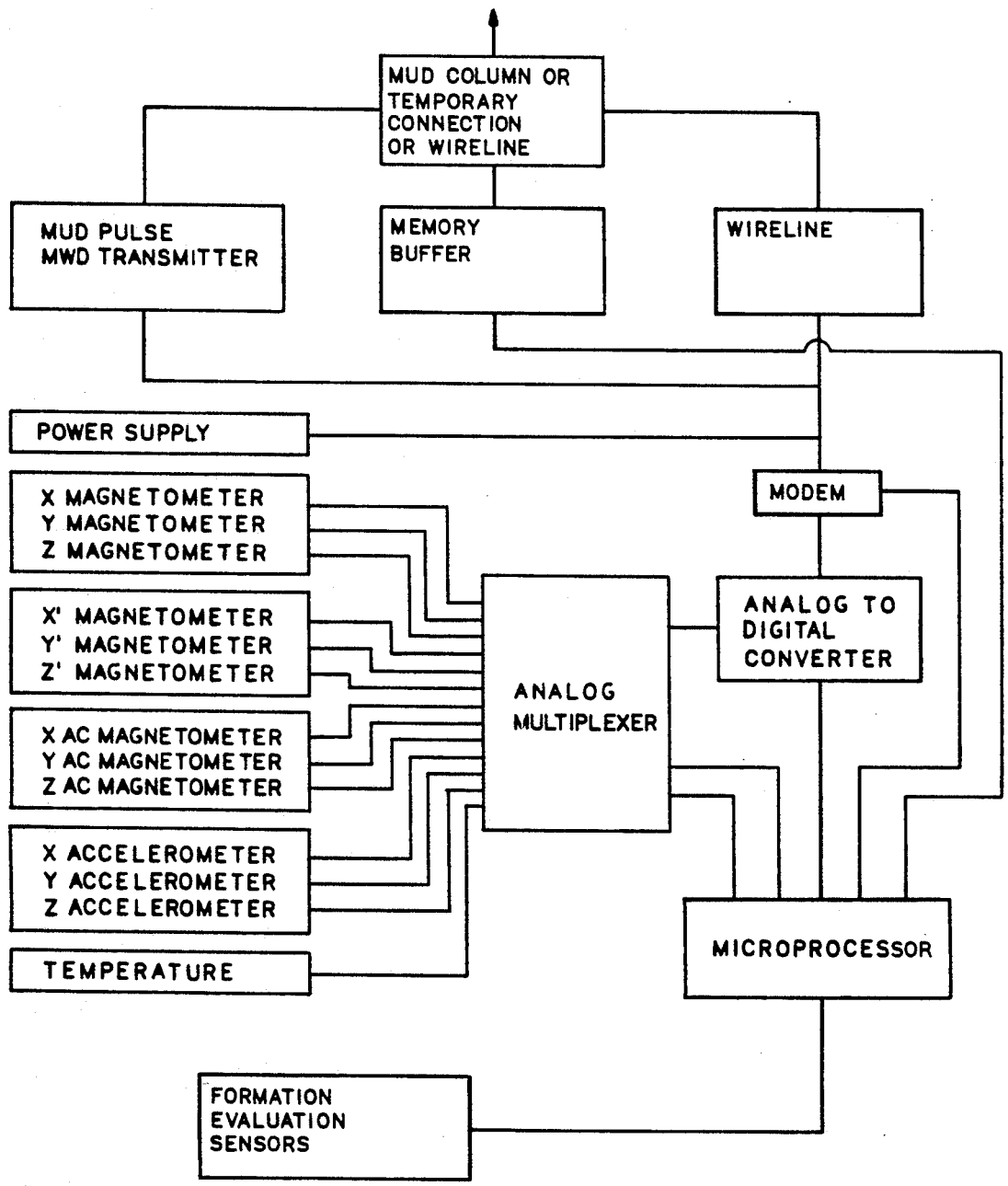
FIG. 11 is a block diagram of subsurface electronics in the subsurface sensing package.
Figure 12:
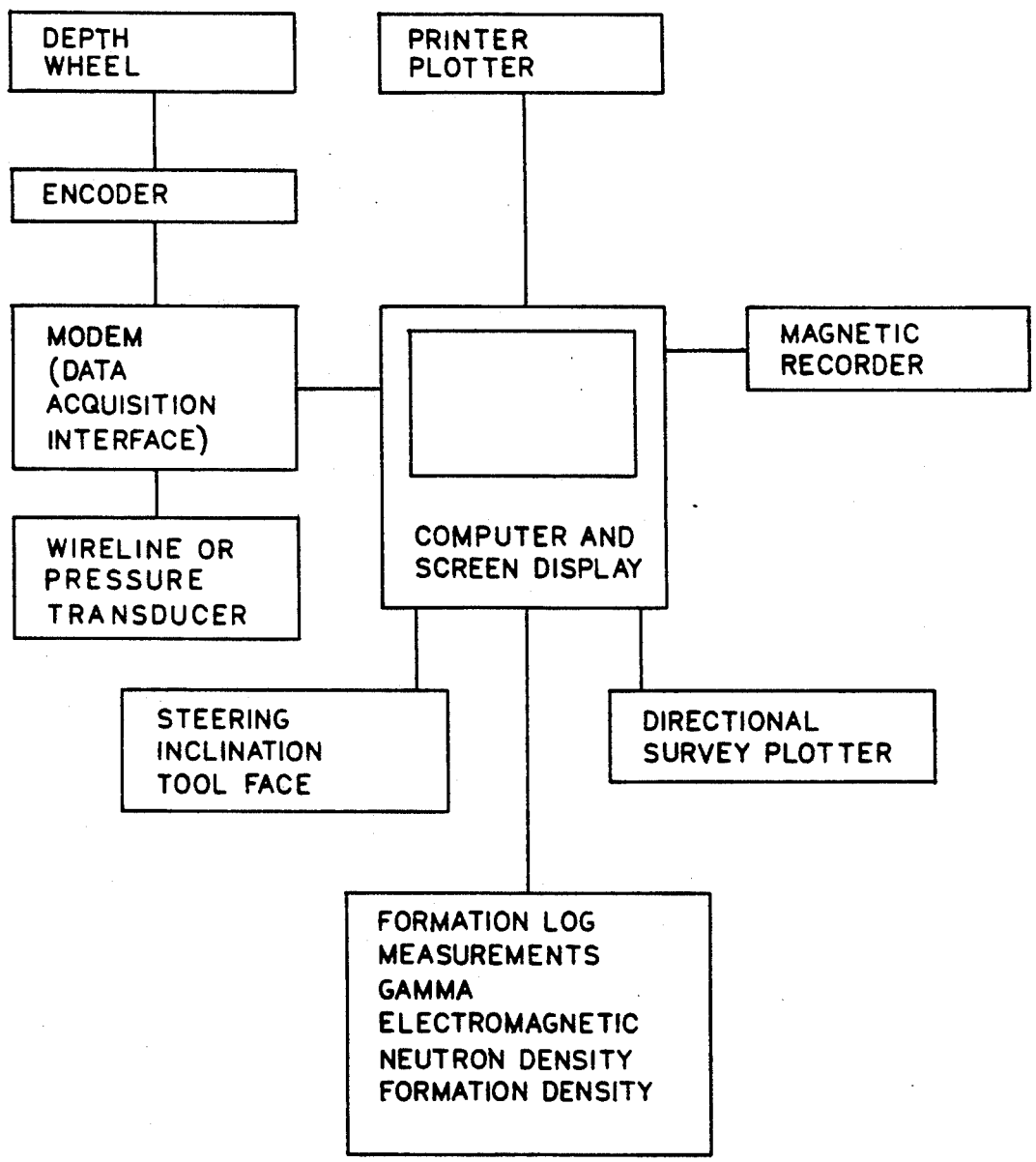
FIG. 12 is a block diagram of the surface electronics instrumentation.

As shown in FIG. 10 and schematically in FIG. 11, electrical power may be supplied through the shielded power supply through a cable 106 which is connected to the rear connector housing. The cable 106 may also carry the signals generated by the sensing devices back to the surface and can be used to install and retrieve the tool into or from the drillstring. Power for the subsurface instrumentation and current injection may be alternatively provided by a mud turbine 135 driven generator 137 in a MWD configuration as in FIG. 10A. The measurements may be alternatively transmitted to the surface by a mud pulse telemetry system or stored in the instrument for periodic retrieval or by the wireline.

The mud pulse telemetry system of the tool as depicted in FIG. 10A could additionally be provided with capability for connection to a wireline in the event that the tool becomes stuck. In this case a wireline could be run down through the drill pipe and to retrieve the information stored in downhole memory. This information is very valuable and costly to obtain and such provision for obtaining even if the tool becomes lost would be very valuable.

The wireline configuration as depicted in FIG. 10 could also be provided with downhole memory storage for information in the event that some problem developed with the wireline which prevented telemetry of information to the surface, but which did not prevent retrieval of the tool 100 by the wireline so that the information could be read out once the tool was pulled back to the surface. A temperature probe and a power supply monitor are used to provide information concerning the condition and stability of the tool performance. The analog multiplexer receives all signals and feeds them in serial form to the analog to digital converter. All are under the control of the microprocessor.

The configuration and size of the tool 100 is designed so that it will fit in a non-magnetic collar 16 in the drill string and allow a sufficient flow of drilling fluid to pass around it and on to the turbine 21 and drilling bit 22 for efficient drilling of the formation. FIGS. 2, 2A.

Figures 13, 14:
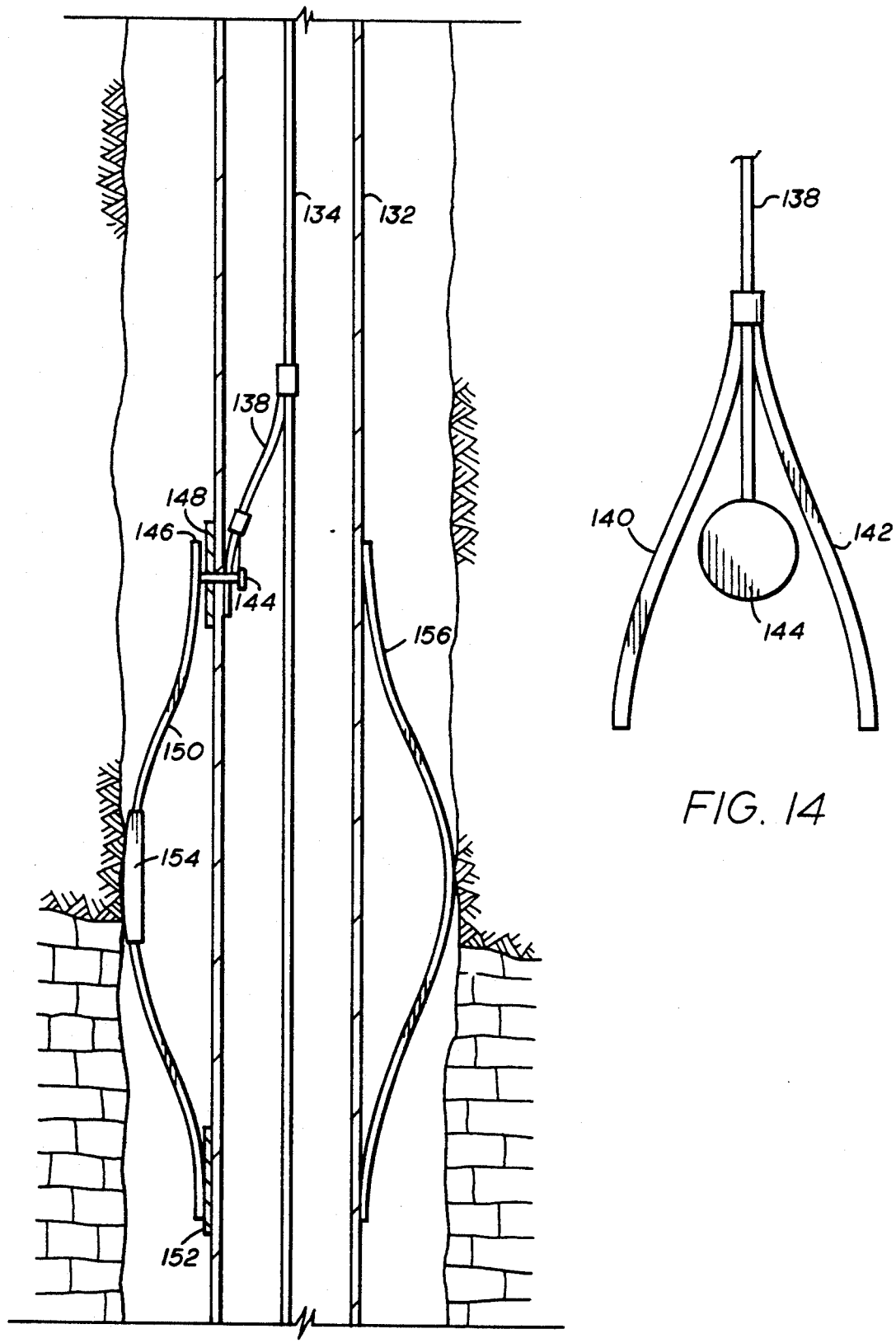
FIG. 13 is an elevational view in section illustrating an embodiment of the invention incorporating an electrical system for injecting direct or alternating current into the formation.
FIG. 14 is a partial cross section through FIG. 13 illustrating the bifurcated guide and latch device for current injection.

Referring to FIGS. 13 and 14 an embodiment of this invention is disclosed generally as 130 which achieves transfer of electrical current from the power and control conductor located within the drill string 23 into the formation being drilled. An electrical conductor 134 extends through the drill string along with the wireline 106 which is utilized to install and retrieve the subsurface formation data tool of FIG. 10. At the lower end of conductor 134 is provided an elongated guide and latch device 138 which projects outwardly to a location along the inner wall surface of the drill string. Refer to FIGS. 13 and 14. The guide and latch device 138 is of bifurcated form defining a pair of depending guide legs 140 and 142 and forming a pin latch receptacle 144 at the diverging juncture thereof. Refer to FIG. 14. The depending guide legs are of curved or spiral form such that at least one of them will come into guided relation with an electrical conducting pin 146 as the guide and latch device is moved downwardly along with the wireline 106 and tool 100. The electrical conducting pin 146 as the guide and latch device is supported by an insulating and supporting element or composition 148. An elongated leaf spring member 150 extends from the conducting pin 146 and has a central portion curving outwardly toward the formation. A lower electrically insulating connector 152 connects the lower end of the feeler spring to the outer wall of the drill string. A formation contactor 154 is secured to the central portion of the feeler spring and engages the formation with sufficient force to penetrate through the drilling fluid cake and establish efficient electrically transmitting contact with the wall of the well bore. Electrical current, typically time varying current will be transferred from the conductor 134 within the drill string through the wall of the drill string and into the formation for development of a time varying electromagnetic field. A centralizing leaf spring 156 is positioned opposite the leaf or feeler spring 150 and junctions to contact the well bore and introduce a centralizing force to prevent misorientation of the drill string.

c. Subsurface Electronics

The sensors and associated electronics provide a conditioned digitized multiplexed signal capable of being transmitted up the borehole to the surface. The two triaxial magnetometers used may be models 7003xx as manufactured by Tensor, Inc. The two accelerometers may be Sunstrand Model Number 979-0150 as manufactured by Sunstrand Data Control. Additional description and operation of flux-gate magnetometers in general are given in U.S. Pat. No. 4,072,200 FIGS. 12–15, and column 19 line 50 to column 23, line 18. The triaxial magnetometers have three mutually orthogonal sensing elements as described. Further, description and operation of accelerometers in general are given in U.S. Pat. Nos. 3,791,043 and 4,083,117.

The time varying magnetic field sensors along each axis comprise a coil in parallel with a tuning capacitor as described at column 23, line 19–37 in conjunction with FIG. 16 of U.S. Pat. No. 4,072,200 which is herein incorporated by reference. Each of the sensing devices produces an analog signal representative of the magnitude of the particular variable measured for recording, readout, or computation, including:

$X_1$ = Static Magnetic Field Intensity of Magnetometer 111 along X axis.
$Y_1$ = Static Magnetic Field Intensity of Magnetometer 111 along Y axis.
$Z_1$ = Static Magnetic Field Intensity of Magnetometer 111 along Z axis.
$X_2$ = Static Magnetic Field Intensity of Magnetometer 113 along X axis.
$Y_2$ = Static Magnetic Field Intensity of Magnetometer 113 along Y axis.
$Z_2$ = Static Magnetic Field Intensity of Magnetometer 113 along Z axis.
ALT X = Alternating Magnetic Field Intensity of Triaxial Coil 117 along X axis.
ALT Y = Alternating Magnetic Field Intensity of Triaxial Coil 117 along Y axis.
ALT Z = Alternating Magnetic Field Intensity of Triaxial Coil 117 along Z axis.
GX = Accelerometer reading along X axis from accelerometer 119.
GZ = Accelerometer reading along Z axis from accelerometer 120.
GY = Accelerometer reading along Y axis from accelerometer 121.
TEMP = reading from temperature sensor.
PWR power Supply Voltage.

2. SURFACE EQUIPMENT equipment may best be explained in conjunction with FIG. 12 which is a block diagram of the surface system. The serialized signal from downhole is received by a second modem which decodes the signal for use by the computer. Additionally, a transducer identified as a depth wheel encoder transmits a digitized signal indicating the depth of the tool in the borehole. The depth signal may be easily generated by a wheel over which the wireline passes before entering the borehole. The apparatus is fitted with a light source and detector which transmits a pulse to the computer with each wheel revolution. The computer then transforms the revolutions to depth.

All of the decoded signals are passed on to a computer which is programmed according to the theory section above to calculate the following values using the methods previously described:

$TOTAL_1$ = Total magnetic field intensity by resolution of components $X_1$, $Y_1$ and $Z_1$.
$TOTAL_2$ = Total magnetic field intensity by resolution of components $X_2$, $Y_2$ and $Z_2$.
RADIAL = Total magnetic field intensity in a plane orthogonal to the Z axes by resolution of $X_1$ and $Y_1$.
GRAD $X = X^1 - X^2$/separation
GRAD $Y = Y^1 - Y^2$/separation
GRAD $Z = Z^1 - Z^2$/separation
DEPTH = Wireline position.
AZIMUTH = Deviation of borehole from north
INCLINE = Inclination of borehole from vertical
TF = Orientation of tool face with respect to the high side of the hole.

The data received and the calculated data may be output in several fashions and/or stored by magnetic storage as desired. A COMPAQ ® Portable II computer has been found to be quite useful and versatile for data processing and many equivalents exist. Generally, even after all the signal conditioning, the magnetic data requires expert interpretation while the directional data-AZIMUTH, INCLINE and TF are immediately useful to the directional drilling supervisor. Therefore the data is made available on separate outputs. The sensed magnetic data may be continuously plotted as well as recorded on magnetic disc or tape for future processing. The instantaneous direction and distance to the target may also be displayed or printed. Additionally, any measured or calculated value may be displayed on a real time or continuously updated display on the computer monitor. The magnetic data requires expert interpretation due to the many forms of magnetic field anomalies encountered but the tool and surface equipment provide opportunities to continuously monitor the progress of the borehole as it nears the target.

C. SURVEY SYSTEM OPERATION

In operation, the downhole tool may be connected to a wireline which is passed over the depth measurement wheel. The tool is then lowered down through the drill string where it seats in the non-magnetic drill collar. Data being received and processed by the tool is then transmitted to surface data receiving and processing equipment by single or multiple wireline electric conductors. Alternatively the downhole instrumentation is housed in a specially constructed Monel Measurement While Drilling (MWD) drill collar. The drill collar is then made up in the drill string and positioned close to the downhole mud motor which turns the drill bit. Power is supplied by internal batteries, a connected wireline, or from an internal mud turbine generator. Measured information is telemetered to the surface by hydraulic mud pulse transmission, or a connected electric wireline either inside or outside the drill string, or by periodically connecting an electric wireline into a downhole memory to receive data stored there. An alternative MWD type tool would use the mud pulse telemetry or memory storage system.

The subsurface tool travels with the drill string down the borehole being drilled and the survey is made. Based upon the data provided by the subsurface instrument, the course of the borehole is controlled. The directional drilling is altered until the subsurface field sensing apparatus determine that the borehole is aligned in the direction desired, toward a target casing in a blowout case or away from other wells in the case of multiple wells drilled from a single platform. If the passive mode is selected, the subsurface sensing apparatus will simply sense the magnetic field of the target superimposed upon the earth's magnetic field.

In order to orient the apparatus with respect to the surface geographical coordinates, it can be useful to know the field intensity, the direction with respect to magnetic north, and dip angle of the earth's field. All of these will be unique values depending upon the exact location on the earth's surface where the drilling is to take place. Much of this information is provided by surveys that are readily available in the industry.

As the instrument is being lowered, measurements of the magnetic field intensity components are made. The surface instrumentation accepts the measurements and supplies them to the computer which organizes and analyzes the data. In the electric wireline configuration, when the tool becomes engaged in the non-magnetic drill collar, the data is continuously output and transmitted up the hole to the surface equipment as noted previously. In the MWD configuration, the data is continuously output into the hydraulic mud pulse telemetry system and transmitted up the hole to surface equipment as noted previously. Alternately the data is stored into a memory bank where it can be retrieved by a wet connected electric wireline conveyed tool designed to accept the information dumped by the downhole memory bank, or the memory bank can be dumped when the drill collar is retrieved back at the surface after all of the drill pipe is pulled out of the hole.

Although no techniques have been described in detail for carrying out the calculations for target range, target direction and tool orientation, anyone skilled in the computer art can program a computer to solve the equations provided herein and to apply the technique of vector analysis with the required data. Although the calculations may be carried out by any calculator, as noted above, the COMPAQ computer or equivalent may be used.

The foregoing description of the invention has been directed to particular preferred embodiments of the present invention for purposes of explanation and illustration. It will be apparent however, to those skilled in this art, that many modifications and changes in the apparatus and method may be made without departing from the scope and spirit of the invention. It is therefore intended that the following claims cover all equivalent modifications and variations as fall within the scope of the invention as defined by the claims.

What is claimed is:

1. A survey system used in borehole drilling applications to determine range and direction to a ferromagnetic body, comprising:
   (a) a downhole tool comprising a non-magnetic tool housing which defines a longitudinal axis and is positionable at a location within a borehole;
   (b) magnetic field sensing means mounted in said housing for generating magnetic field data, said magnetic field sensing means comprising at least one pair of triaxial static magnetic field sensors spaced apart a predetermined distance along said longitudinal axis of said tool housing for measuring static magnetic fields; and
   (c) processing means operably connected to said magnetic field sensing means for determining magnetic field gradient information from said magnetic field data, said processing means further determining the direction to said ferromagnetic body using said magnetic field data and said magnetic field gradient information and the range to said ferromagnetic body using said magnetic field data and said magnetic field gradient information.

2. The survey system of claim 1, wherein said magnetic field sensing means further comprises triaxial time varying magnetic field sensors mounted in said tool housing for measuring time-varying magnetic fields.

3. The survey system of claim 2 further comprising gravity field sensing means mounted in said housing for generating gravity field data.

4. The survey system of claim 3, wherein said processing means is further operably connected to said gravity field sensing means for determining borehole azimuth and inclination using said gravity field data and said magnetic field data.

5. The survey system of claim 4 wherein said at least one pair of triaxial static magnetic field sensors comprise triaxial magnetometers arranged for measurement of magnetic field strength along orthogonal x, y and z axes, said x and y axes being disposed in normal relation and perpendicular to the central axis of said housing and said z axis being coincident with the central axis of said housing, said triaxial magnetometer providing electrical signal outputs representing static magnetic field measurements.

6. The survey system of claim 5 wherein said triaxial time varying magnetic field sensor comprise at least one triaxial AC magnetometer arranged for measurement of varying magnetic field strength along orthogonal x, y and z axes, said x and y axes being disposed in normal relation and perpendicular to the central axis of said housing and said z axis being coincident with the central axis of said housing, said at least one triaxial AC magnetometer providing an electrical signal output representing time varying magnetic field measurements.

7. The survey system of claim 6 wherein said gravity field sensing means comprises at least one triaxial accelerometer for measurement of the components of the earth's gravity field along orthogonal x, y and z axes, said x and y axes being disposed in normal relation and perpendicular to the central axis of said housing and said z axis being coincident with the central axis of said housing, said gravity field sensing means providing electrical signal outputs representing gravity field measurements.

8. The survey system as recited in claim 7, including means for selectively injecting electric current into an earth formation transversed by said borehole for enhancing the time varying magnetic field of said subterranean ferromagnetic body.

9. The survey system as recited in claim 7, including a data storage system within said tool housing for receiving and storing data received from said surveying means and wherein said processing means is capable of selectively accessing said data storage system.

10. The survey system as recited in claim 9 further comprising a means for communicating data which comprises an electrically conductive cable extending along said borehole from the surface to said downhole tool and operatively connecting said downhole tool to said processing means to enable real-time processing of data received from said surveying means of said downhole tool.

11. The survey system as recited in claim 10, wherein said means for communicating data comprises a fluid pulse signal transmitting system for translating said position-indicating data into fluid pulses, transmitting said fluid pulses through the drilling fluid in said borehole to the surface and translating said fluid pulses back into said position-indicating data for processing by said processing means.

12. The survey system of claim 11 wherein said downhole tool further comprises a signal multiplexing means to multiplex the signals generated by said magnetic and gravity field sensing means into a serialized signals, said signal multiplexing means connected to a signal digitizing means for digitizing said serialized signals prior to transmission, and said downhole tool further comprising microprocessor control means connected to said signal multiplexing and digitizing means and further connected to a tool housing receiving means, said microprocessor control means processing signals transmitted from the surface down a fluid column within said drill string to introduce programmable variables into said signal multiplexing means and said signal digitizing means to modify the multiplexing and digitizing of said signals generated by said magnetic and gravity field sensing means.

13. The survey system as recited in claim 12 wherein said microprocessor control means is further programmed to receive said signals generated by said magnetic and gravity field sensing means and process them for transmission to the surface while drilling is in progress.

14. The survey system as recited in claim 13 wherein said microprocessor control means accepts said signals from said magnetic and gravity field sensing means and serializes each individual signal so that a single composite signal may be transmitted to the surface on a single conductor.

15. The survey system of claim 14, further comprising a computer means located at the surface for receiving said signal composite signal, said computer including a display means for current visual display of downhole information from said single composite signal and a printer/plotter for permanent display of downhole information.

16. The survey system according to claim 3 further comprising means, mounted within said tool hosing, for measuring formation characteristics to provide formation evaluation of the strata through which said tool is progressing.

17. The survey system as recited in claim 16, wherein said means for measuring formation characteristics includes a gamma ray source and gamma ray detection means mounted within said tool housing, said gamma ray source and gamma ray detection means being operatively connected to said processing means to provide formation porosity information.

18. The survey system as recited in claim 17, wherein said means for measuring formation characteristics includes means for measuring electrical resistivity, mounted within said tool housing, said electrical resistivity measuring means being operatively connected to said processing means to provide an electric log of a subterranean earth formation intersected by a well bore.

19. The survey system as recited in claim 18, wherein said means for measuring the characteristics of the formation being drilled provides a log of said formation and further includes means for measuring drillstring dynamics including torque, weight on bit, and harmonics.

20. The survey system recited in claim 19 wherein said means for measuring the characteristics of a formation being drilled further comprises an electrical resistivity measuring means for measuring the electrical resistivity of said formation and providing output signals reflecting formation density.

21. The survey system as recited in claim 20, wherein said means for measuring the characteristics of the formation being drilled further comprises electrical conductivity measuring means, temperature measuring means, neutron and density logging means and electromagnetic wave logging means.

22. The survey system as recited in claim 21 wherein said means for measuring the characteristics of the formation being drilled further comprises radioactive logging means for conducting a radio active log of said formation intersected by said borehole.

23. A method of directional subsurface drilling of a borehole to intersect a subterranean ferromagnetic target, comprising the steps of:
(a) measuring components of a total magnetic field along orthogonal axes at any location in said a borehole sufficiently proximate to said target to detect a magnetic field of said target superimposed upon the earth's field using at least two triaxial static magnetic field sensors spaced apart a predetermined distance;
(b) determining magnetic field gradient information from said components of said total magnetic field measured by said at least two triaxial static magnetic field sensors and said predetermined distance;
(c) determining target direction using said components of said total magnetic field and said calculated magnetic field gradient information;
(d) determining target range using said components of said total magnetic field and said calculated magnetic field gradient information; and
(e) orienting borehole trajectory dependent upon said direction and range determination so that said borehole will intercept said target.

24. The method according to claim 23 further comprising the step of successively measuring said components of said total magnetic field using said at least two triaxial static magnetic field sensors spaced apart a predetermined distance.

25. The method according to claim 24 further comprising the step of successively determining said magnetic field gradient information from said successively measured components of said total magnetic field.

26. The method according to claim 25 further comprising the step of successively determining target range and direction from said successively calculated magnetic field gradient information.

27. The method according to claim 26 further comprising the step of projecting an expected target trajectory and correcting the relief well drilling plan dependent upon said successive target range and direction determinations so that said borehole will intercept said target.

28. The method according to claim 27 further comprising the step of measuring selected characteristics of a formation being drilled to provide formation evaluation of the strata through which said borehole is progressing.

29. The method of claim 1 wherein said borehole orientation with respect to said target is determined by the direction and range from said borehole to said target.

30. The method of claim 29 wherein said borehole orientation is further determined with respect to said barge as north and south.

31. The method of claim 30 wherein said orientation of said borehole either north or south of said target is determined by:
 (a) continuously plotting a gradient of said total magnetic field along an axis of said borehole;
 (b) continuously plotting a total radial component of said total magnetic field in a plane perpendicular to said borehole axis;
 (c) comparing said gradient and radial plots to determine whether an existing combination of north pole and reduced radial field or south pole and increased radial field indicates that said target is in a southernly direction or whether the combination of north pole and increased field or south pole and decreased field indicates that said target is in a northerly direction.

32. The method of claim 27 further comprising transferring electrical current from a location within a drill string into said formation being drilled at a depth location near a drill bit for development of an electromagnetic field in said formation and for other data collection activities.

33. The method of claim 32, wherein said electric current is an alternating electrical current for development of an alternating electromagnetic field.

* * * * *